(12) United States Patent
Vessels et al.

(10) Patent No.: US 12,039,317 B2
(45) Date of Patent: Jul. 16, 2024

(54) SYSTEMS AND METHODS FOR SECURE OVER-THE-AIR UPDATES FOR CYBER-PHYSICAL SYSTEMS

(71) Applicant: Honeywell International Inc., Charlotte, NC (US)

(72) Inventors: Ly Vessels, Chandler, AZ (US); William Neumann, Robbinsdale, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/239,222

(22) Filed: Apr. 23, 2021

(65) Prior Publication Data

US 2021/0334085 A1  Oct. 28, 2021

Related U.S. Application Data

(60) Provisional application No. 63/014,891, filed on Apr. 24, 2020.

(51) Int. Cl.
*G06F 8/65* (2018.01)
*G06F 21/60* (2013.01)
*H04L 9/40* (2022.01)

(52) U.S. Cl.
CPC .............. *G06F 8/65* (2013.01); *G06F 21/602* (2013.01); *H04L 63/0428* (2013.01)

(58) Field of Classification Search
CPC ............ G06F 8/65; G06F 8/71; G06F 21/602; G06F 21/606; H04L 63/0428
See application file for complete search history.

(56) References Cited

U.S. PATENT DOCUMENTS

| 10,057,243 | B1* | 8/2018 | Kumar | H04L 63/0823 |
|---|---|---|---|---|
| 11,284,258 | B1* | 3/2022 | Wei | H04L 63/10 |
| 2011/0078675 | A1* | 3/2011 | Van Camp | G06F 8/65 |
| | | | | 717/172 |
| 2017/0180391 | A1* | 6/2017 | Hinchliffe | H04L 67/34 |
| 2018/0145991 | A1 | 5/2018 | McCauley et al. | |
| 2019/0098494 | A1* | 3/2019 | Pry | H04W 12/03 |
| 2019/0102164 | A1 | 4/2019 | Gur et al. | |

(Continued)

OTHER PUBLICATIONS

European Search Report dated Sep. 24, 2021 in European Application No. 21170020.8 (8 pages).

*Primary Examiner* — S. Sough
*Assistant Examiner* — Cheneca Smith
(74) *Attorney, Agent, or Firm* — Lorenz & Kopf LLP

(57) ABSTRACT

Systems and methods are disclosed for providing secure remote software updates to a cyber-physical systems (CPS) device. The method may include receiving, at a first server, data used to update software of at least one CPS device, converting the data into a first format, establishing a secure connection between the first server and a second serve, transmitting the data in the first format from the first server to the second server, identifying each CPS device that is authorized to receive a software update, encrypting a software update package to ensure that the software update is decrypted by each CPS device that is authorized to receive the software update and is not decrypted by an CPS device that is not authorized to receive the software update, and transmitting the encrypted software update package to each CPS device.

18 Claims, 21 Drawing Sheets

(56) References Cited

U.S. PATENT DOCUMENTS

2019/0187971 A1* 6/2019 Wang .................... H04W 12/06
2019/0227784 A1* 7/2019 De Atley ................. G06F 8/65
2020/0177561 A1* 6/2020 Kruger ................. G06F 21/572

* cited by examiner

SYSTEMS AND METHODS FOR SECURE OVER-THE-AIR UPDATES FOR CYBER-PHYSICAL SYSTEMS

RELATED APPLICATIONS

This application claims the benefit of priority to U.S. Provisional Application No. 63/014,891 filed Apr. 24, 2020, the entirety of which is incorporated herein by reference.

TECHNICAL FIELD

Various embodiments of the present disclosure generally relate to providing updates to cyber-physical systems (CPS) and, more particularly, to providing a secure path for updates to be passed from a supplier to a customer to an end device.

BACKGROUND

Cyber-physical systems (CPS) operate under an assumption that the software operating the physical aspects of a system are safe, but many of these systems were developed before the concept of cyber-crime. While there is considerable effort to improve the security of these cyber-physical systems, there is less focus on weaving security into the software as it is developed throughout its life-cycle. The result of this lack of focus is the need for expensive perimeter protection solutions.

Performing secure software upgrades on cyber-physical system (CPS) devices (e.g., actuators) are currently done manually, with a human visiting each CPS, physically connecting a software loading device to the CPS, pushing the update to the device, and initiating the update process. When a site has hundreds to thousands of these devices, this process requires an enormous investment in time and effort. Additionally, updates should come with a proof of integrity, authenticity of the source, and non-repudiation.

Thus, there is a need to provide a secure path for the updates to be passed from the supplier to the customer to the end device, allowing for bulk distribution and installation of the updates to be performed from a central location at the customer's site, while maintaining the ability to perform individual updates either manually at the device or remotely.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods disclosed relate to providing a secure path for updates to be passed from the supplier to the customer to the end device.

A computer-implemented method is disclosed for providing secure remote software updates to a cyber-physical systems (CPS) device. The method may include receiving, at a first server, data used to update software of at least one CPS device; converting the data into a first format; establishing a secure connection between the first server and a second server; transmitting the data in the first format from the first server to the second server; identifying each CPS device that is authorized to receive a software update; encrypting a software update package to ensure that the software update is decrypted by each CPS device that is authorized to receive the software update and is not decrypted by an CPS device that is not authorized to receive the software update; and transmitting the encrypted software update package to each CPS device.

A system is disclosed for providing secure remote software updates to a cyber-physical systems (CPS) device, the system may include a memory storing instructions; and a processor executing the instructions to perform a process including: The process may include receiving, at a first server, data used to update software of at least one CPS device; converting the data into a first format; establishing a secure connection between the first server and a second server; transmitting the data in the first format from the first server to the second server; identifying each CPS device that is authorized to receive a software update; encrypting a software update package to ensure that the software update is decrypted by each CPS device that is authorized to receive the software update and is not decrypted by an CPS device that is not authorized to receive the software update; and transmitting the encrypted software update package to each CPS device.

A non-transitory computer-readable medium is disclosed for storing instructions that, when executed by a processor, cause the processor to perform a method for providing secure remote software updates to a cyber-physical systems (CPS) device. The method may include receiving, at a first server, data used to update software of at least one CPS device; converting the data into a first format; establishing a secure connection between the first server and a second server; transmitting the data in the first format from the first server to the second server; identifying each CPS device that is authorized to receive a software update; encrypting a software update package to ensure that the software update is decrypted by each CPS device that is authorized to receive the software update and is not decrypted by an CPS device that is not authorized to receive the software update; and transmitting the encrypted software update package to each CPS device.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
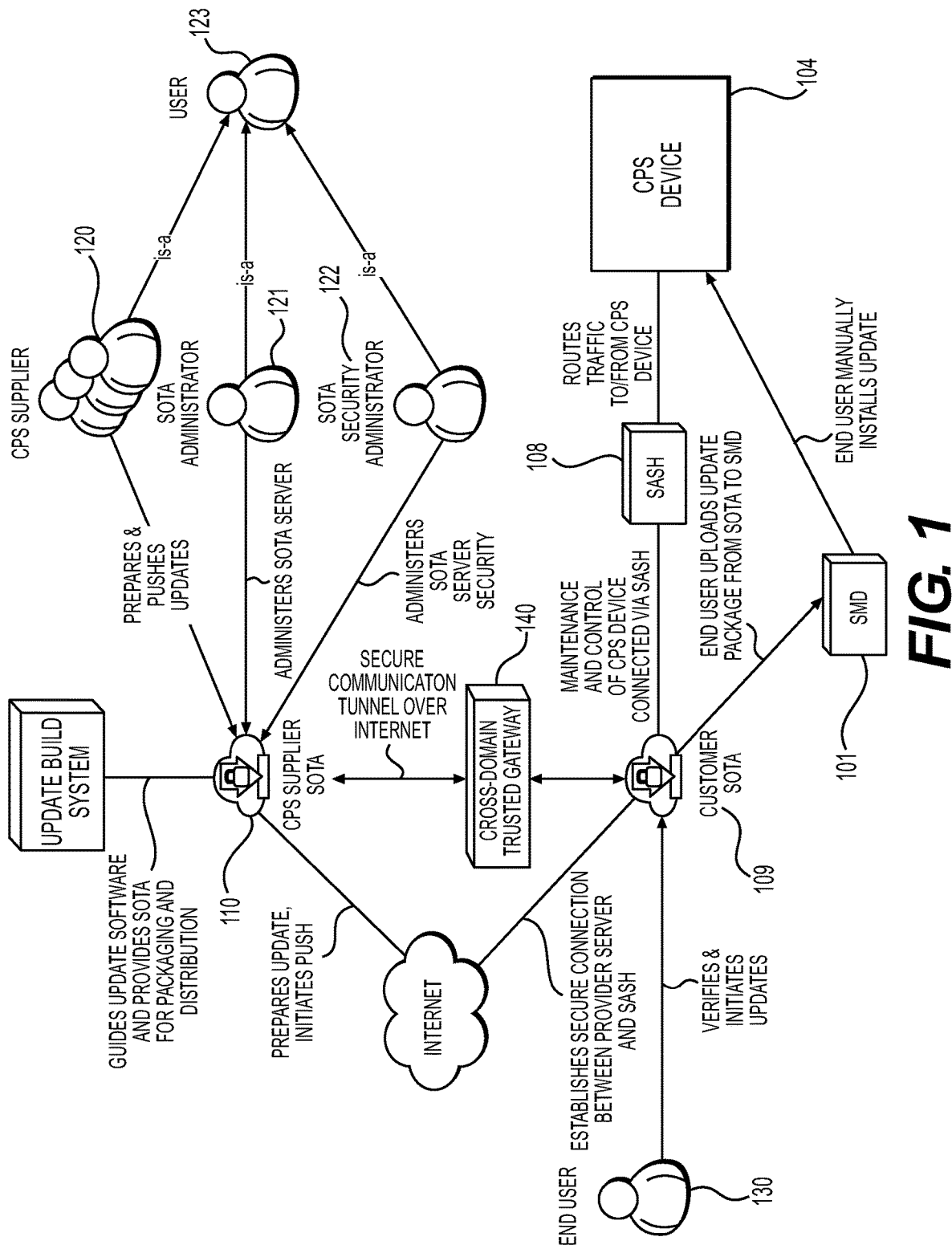
FIG. 1 depicts an example SOTA (Secure-Over-The-Air) Update Context View, according to one or more embodiments.

The following embodiments describe methods and systems for Secure Over-the-Air Update system (SOTA). Embodiments disclosed herein may be directed to providing a secure path for updates to be passed from the supplier to the customer to the end device allowing for bulk distribution and installation of the updates to be performed from a central location at the customer's site, while maintaining the ability to perform individual updates either manually at the device or remotely.

According to one or more embodiments, the present disclosure relates to one or more objectives including: automatically determining the set of CPS devices that should receive any given update and will protect the update so that only that set of devices can see the contents of the update; a single customer may use this system to accept and distribute updates from multiple vendors, maintaining separation between the suppliers by the use of Type 1 hypervisor technology, improving the benefits to the customer; providing a secure, end-to-end solution for delivering CPS firmware/software update packages with the ability to perform bulk, remote updates to a specified set of end devices; supporting multiple suppliers by providing updates for their CPS devices to any given customer site where the updates from each supplier remain completely isolated from and other supplier; performing a packaging of the collection of executable and data files for the update, which happens at the supplier site, followed by establishment of a secure communications channel to the customer site. The secure channel is used to send the update package to the customer; ensuring that a source of a package is a valid supplier, that the contents of the package were not altered in any way following the crating process, and that the package does not contain any known or suspected malicious content; determining a set of end devices that may receive the update by analyzing of the metadata associated with the update package; once the set of end devices is determined, encrypting the update package such that only the CPS devices in the chosen set will be able to decrypt them, establishing a secure communications channel to the CPS network, and sending the update to the CPS devices; authorized CPS devices, upon receipt of the update package, decrypting the package, verifying the authenticity of it, and if authentic, storing the update in protected non-volatile memory until they are instructed to install it; establishing a secure communication channel with a Secure Maintenance Device (SMD) using NFC hardware; once a connection is established, using the connection to transfer the update to the SMD, which can be used to manually install the update on certain CPS devices which require manual updates; improving cyber security to a Security Provider's CPS devices (e.g., actuators); and distributing avionics system updates directly into an aircraft cockpit, thus eliminating a cyber-attack through the maintenance ports; improving cyber security for industrial CPS devices such as devices in plants.

One or more advantages and benefits provided by the embodiments disclosed herein may include: (1) offering a secure end-to-end, automated, remote, bulk update distribution mechanism; the update distribution no longer needs to be performed by manual visits to each device. The updates may be performed in a bulk, remote manner from a central location, saving multiple orders of magnitude in time and effort; (2) establishing a secure channel from each of many suppliers for each single customer site, followed by a method for determining the set of devices to receive the update and finally the secure delivery of the update to only those devices; (3) ensuring that a source of all updates are valid, trusted sources; (4) added security to prevent malicious packages from being distributed, as a push-based system rather than a polling based system; (5) addressing security issues such as maintaining separation between multiple suppliers, encrypting update packages for multicast distribution, or securing fieldbus or NFC connections used in the transfer of updates to the end devices; (6) enabling bulk, remote (e.g., distributed) updates of cyber-physical system (CPS) software/firmware that provides for end-to-end security from the CPS supplier on through to the CPS; (7) assuring the secure and authenticated transmission of the update from any of multiple CPS supplier sites to the customer site and on to the CPS devices that require the update; (8) an ability for a customer to automatically determine the set of CPS devices that require the update and then to remotely perform a bulk transmission and eventual install of the update to just those devices while also retaining the ability to perform manual installation on individual CPS devices as needed; and/or (9) additionally, it assures suppliers that the contents (or even the existence) of their updates remains secret to any other suppliers and is visible and installed only on their CPS devices; provides assurance to the customer that all updates are received from valid sources and have not been altered during transmission; and provides assurance to all parties that all functionality of the respective component is accessible by authenticated users which are authorized to access said functionality.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

The below description includes a System Architecture Description (SAD) and a System Requirements Specification (SRS). For the SAD, the description includes a system architecture overview of the Secure Actuation Smart Hub (SASH), physical view, logical view, data view, security view, dynamic behavior view, and deployment view. The system architecture overview includes the various perspectives (context, system, hardware, software, data, security, interface, dynamic behavior, and deployment) to select implementation technology (make vs buy decision) and development. For the SRS, the description includes a system overview, functional features, data features, hardware features, security requirements, and system restraints.

As an overview of the SAD, the SOTA providing the capabilities for multiple cyber-physical systems (CPS) suppliers to remotely update their software/firmware. According to one or more embodiments, updates to CPS are distributed to assure for security confidentiality, authenticity, integrity, and non-repudiation. This approach allows customers to remotely and rapidly update their CPS devices; thus, eliminating the necessity of man-in-the-loop local updates. This approach not only provides multiple orders of magnitude saving to the customers, it dramatically improves the security robustness of the CPS through up-to-date patch management.

The present disclosure relates to an apparatus that enables for bulk, remote (distributed) updates of cyber-physical system (CPS) software/firmware that provides for end-to-end security from the CPS supplier on through to the CPS. One or more embodiments assure a secure and authenticated transmission of the update from any of multiple CPS supplier sites to the customer site and on to the CPS devices that require the update. One or more embodiments assure provides the ability for the customer to automatically determine the set of CPS devices that require the update and then to remotely perform a bulk transmission and eventual install of the update to just those devices while also retaining the ability to perform a manual installation on individual CPS devices as needed. Additionally, one or more embodiments relate to assuring the suppliers that the contents (or even the existence) of their updates remains secret to any other suppliers and is visible and installed only on their CPS devices; provides assurance to the customer that all updates are received from valid sources and have not been altered during transmission; and provides assurance to all parties that all functionality of the respective component is accessible by authenticated users which are authorized to access said functionality.

According to one or more embodiments, the present disclosure includes four subsystems: the supplier SOTA server, the customer SOTA server, the receive processes running on the external Secure Maintenance Device (SMD), and the CPSs.

According to one or more embodiments, the supplier SOTA uses a collection of updated software/firmware and data required to update a CPS and to create a bundle which can be used by the customer SOTA for further processing and distribution. The supplier SOTA may use a variant of the ARINC 827 standard to package the CPS executables and data into a format used by the customer SOTA-The component provides integrity protection and authentication by including cryptographically strong hashes of the individual components in the package's manifest file and by digitally signing the manifest file using a private key which is vouched for by an authority trusted by the customer SOTA. The component then establishes a secure channel to the customer SOTA using Internet Protocol Security (IPSec), tailored to the needs of the customer and sends the package over the secure channel. For each customer, there will potentially be many different CPS suppliers hosting their instances of a supplier SOTA. Each supplier will provide a build system, as well as an enterprise identity and access management system to interact with the SOTA.

According to one or more embodiments, the customer SOTA receives the update packages sent from the various supplier SOTAs inside an isolated domain, e.g., a virtualized computing environment set up for only that supplier. In that isolated environment, the customer SOTA will verify the authenticity and integrity of the update package and check it for malicious content. If the update passes these security checks, the customer SOTA will use a software update framework to determine the set of CPSs at the customer's site that requires the update. However, the customer SOTA encrypts the update package in such a manner that it can only be decrypted by the set of CPSs that require the update, providing further assurance to the suppliers that the contents of their CPS updates remain unknown to any other supplier. Once encrypted, the customer SOTA pushes the protected update to the CPSs via a secure network, e.g. the Secure Actuation Smart Hub (SASH) or via the Secure Management Device (SMD) for select CPSs which may require manual installation of the update. Access to the customer SOTA, including its virtualized environments will be gated using multi-factor authentication interfaces provided by the SOTA which will interact with the customer's identity and authentication management system to determine whether the user has valid credentials. Access within the system will be granted or denied based on the role of the user.

According to one or more embodiments, the SMD Receive process The listens for connection requests from the customer SOTA and then establishes a secure connection with the SOTA. The SMD Receive process uses a modified networking stack to establish this connection. This modification adds IPSec capabilities on top of the SMD's NFC data link and physical layers. Once the secure connection is established, the customer SOTA pushes the package to the SMD Receive process for storage in protected memory and later installation onto a CPS.

According to one or more embodiments, the CPS Receive process listens for connection requests from the customer SOTA and then establishes a secure connection with the SOTA. The CPS Receive process uses a modified networking stack to establish this connection. This modification adds IPSec capabilities on top of the data link and physical layers of whatever networking protocol is supported by the device, e.g. Profinet®, Modbus®, or CAN bus. Once the secure connection is established, the customer SOTA pushes the package to the receiving process for storage in protected memory until the installation of the package is initiated by an end user.

The combination of these technologies allows for a secure end-to-end solution for bulk software updates to the CPS devices at the customer's sites which may currently be manually distributed to each CPS at great cost and effort.

The specifics of how to build the SOTA, according to one or more embodiments, is provided herein. For example, the system architecture description (SAD) for the SOTA is provided below. It is understood that the SOTA is not restricted to the SAD provided below and that there may be variations to the SAD in alternative embodiments.

As described above, the one or more objectives of this specification of the SOTA are to provide a system architecture over of the SOTA, including the various perspectives (e.g., context, system, hardware, software, data, security, interface, dynamic behavior, and/or deployment) for selecting implementation technology (e.g., make vs. buy decision) and development.

This specification is organized into several sections. The Capabilities Highlights section describes the capabilities provided by the system. The System Architecture Overview section provides an overview of the system in the context of its users and other external systems it interacts with. The Physical View section describes the hardware architecture that the software runs on and the interactions/relationships between the components. The Logical View section describes the top-level software architecture and the interactions/relationships between the components. The Data View section captures the data architecture of the system; specifically, the data structure and the relationships among the data/components. The Security View section describes the system architecture with security measures and security relevant components. The Dynamic behavior View section describes the behavior of the system over time and the various states the components of the system may be in. The Deployment View section captures the system deployment environment.

Referring now to the appended drawings, FIG. 1 depicts a SOTA Update Context View, according to one or more embodiments. SOTA is a collection of subsystems that provides the capabilities for multiple CPS suppliers to crate software/firmware updates for their CPS devices and deliver them securely to a customer site where the customer can then securely deliver the updates to the end devices and perform bulk updates on these devices. FIG. 1 identifies the users that the SOTA supports, and the external systems that interact with the SOTA to enable its capabilities. For example, as illustrated in FIG. 1, the SOTA system may include one or more of SMD 101, CPS device 104, SASH 108, customer SOTA 109, CPS supplier SOTA 110, CPS supplier 120, SOTA administrator 121, SOTA security administrator 122, user 123, end user 130, and/or Cross-Domain Trusted Gateway 140.

According to one or more embodiments, the SOTA provides one or more of the following capabilities to the end users (e.g., CPS suppliers, users). The SOTA may authenticate user and only permits valid CPS supplier end users to create software revisions, firmware revisions, diagnostics, production testing, and parameter configurations for the CPS Device. The SOTA crates the CPS software revisions, firmware revisions, parameter configurations, and data into a standardized format for further distribution to the end CPS devices. The SOTA transfers the CPS update crate from the supplier SOTA system to the customer SOTA system. The crate is encrypted prior to transmission to the customer. The SOTA guards against leakage of sensitive information from the customer by employing an external cross-domain trusted gateway to ensure all data leaving the customer security boundary has been properly sanitized and downgraded. The SOTA may authenticate user and only permit valid customer end users to process software revisions, firmware revisions, diagnostics, production testing, and parameter configurations for distribution to the CPS Device. The SOTA may authenticate the update on the customer SOTA to ensure it comes from a valid and scan the updates for malware before further processing the crated update for distribution. The SOTA processes the CPS update crate on the customer SOTA system to determine the set of CPS devices which may receive the update and then encrypt the update so that it can be decrypted only by those devices in the set. The SOTA securely push the encrypted update to the set of CPS devices determined by the customer to require the update. The SOTA may authenticate the update on the CPS device to ensure it comes from a valid source and then securely store for installation. The SOTA may authenticate user and only permit valid end user and Cyber-Physical System (CPS) suppliers to load software revisions, firmware revisions, diagnostics, production testing, and parameter configurations into the CPS Device. The SOTA performs diagnostics of the SOTA subsystems; allowing the SOTA administrators to diagnose and maintain the SOTA.

Moreover, the customer SOTA has the capabilities to interact with the Cyber SMD 101 to allow the end user to push the update package to the SMD to perform a local update instead of a distributed one.

According to one or more embodiments, the Security Provider may create the SOTA with enough security to meet NIST SP 800-53 to achieve NIST RMF assessment and authorization and SABI/TABI certifications.

Figure 2:
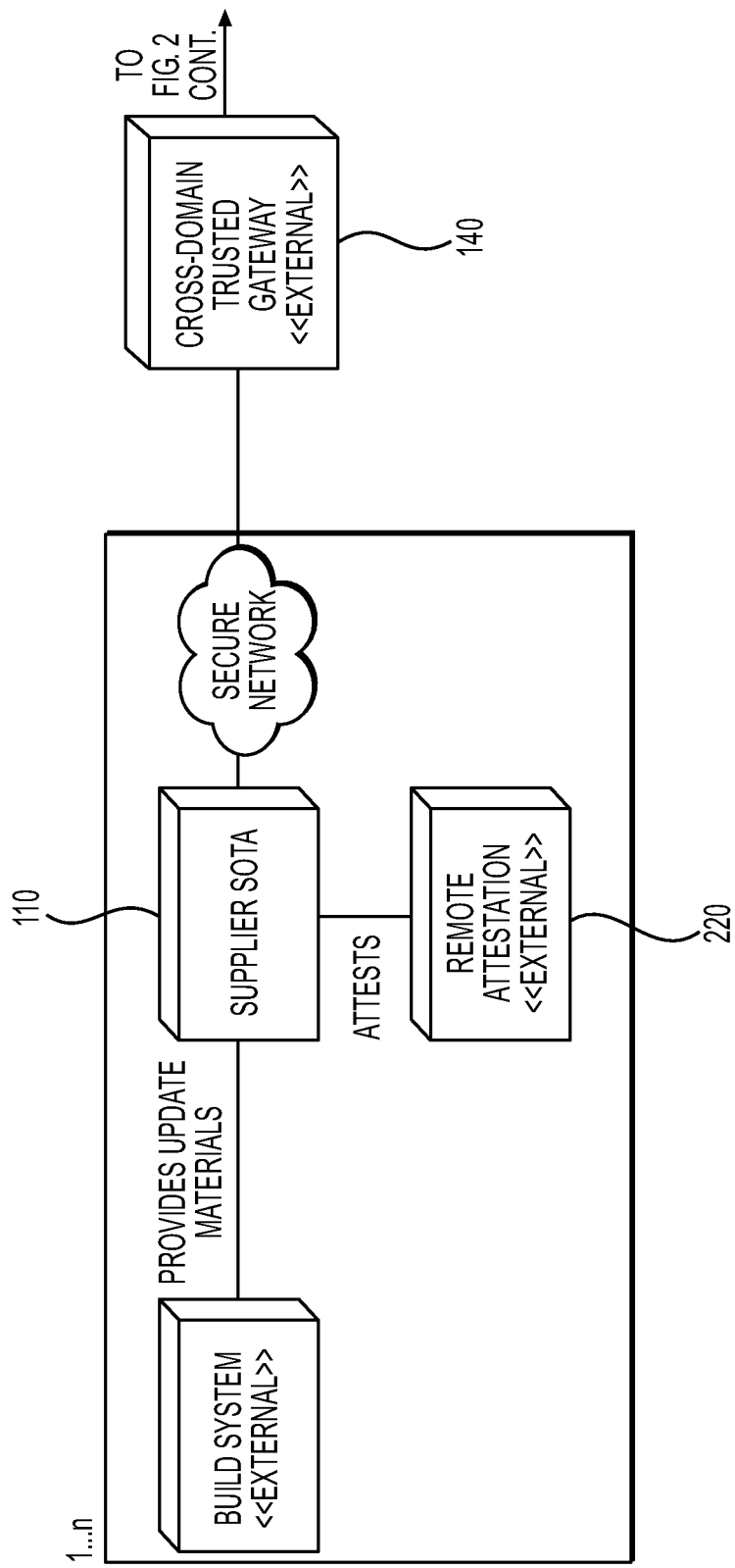
FIG. 2 depicts an example SOTA System Architecture Overview, according to one or more embodiments.
Figure 2:
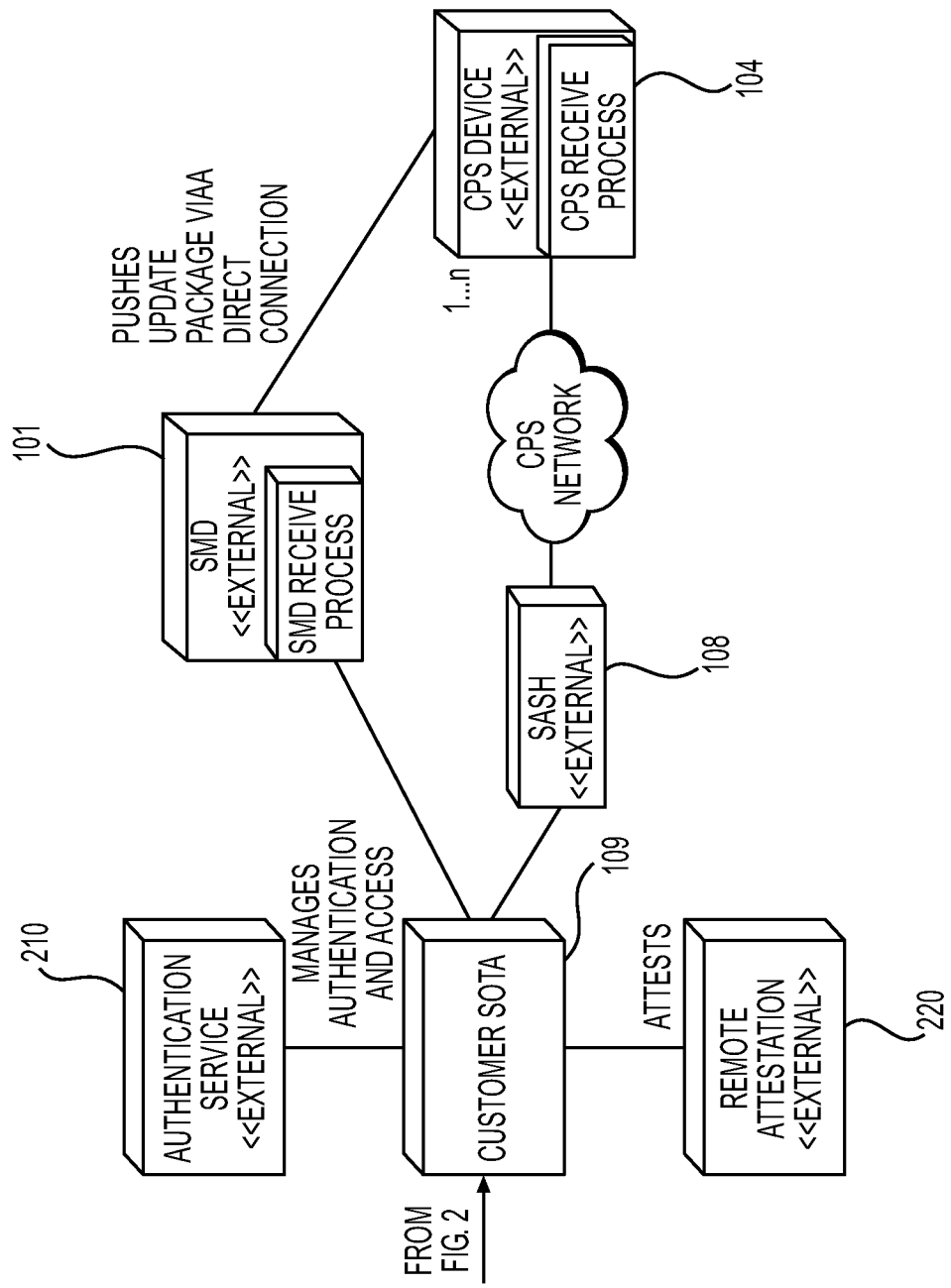

FIG. 2 depicts an example SOTA System Architecture Overview, according to one or more embodiments. The SOTA system architecture includes four components, the supplier SOTA Server 110, the customer SOTA Server 109, the CPS devices 104, and the SMD 101. The customer SOTA server 109, SMD 101, and CPS devices 104 all reside in the same location, the CPS Platform and are connected together via the SASH network 108, an external system. The supplier SOTA servers 110 and the customer SOTA 109 server sit in separate locations and connect to each other via a secure network connection.

According to one or more embodiments, the supplier SOTA 109 is a subsystem that resides with the supplier of some CPS devices 104 used by the customer. Its purpose is to receive updates for those end devices from an external build system and package them to be sent securely to the customer SOTA 109 where further processing will allow them to be installed only by the specified set of devices. These updates are pushed across a secure network connection over a secure connection that has been established with a receiving process running on the customer SOTA.

According to one or more embodiments, the customer SOTA 109 is a subsystem that resides at the CPS platform along with the SMD 101 and CPS devices 104. Its purpose is to host within a hypervisor a number of virtual machines, one for each CPS supplier that may be providing updates. Additionally, the customer SOTA 109 will receive the packaged updates from one of the potentially many supplier SOTAs 110, passing the packages into the appropriate virtualized customer SOTA 109 machine for further processing and distribution.

According to one or more embodiments, the customer SOTA 109 connects to the supplier SOTA over a secure network connection and may use multiple NICs for this purpose to ensure that only the appropriate supplier's virtual machine is able to see updates from that supplier's SOTA.

According to one or more embodiments, the customer SOTA 109 also connects to the SMD and CPS Devices via NFC with an added IPSec layer for communication security.

According to one or more embodiments, the customer SOTA 109 will employ a cross-domain trusted gateway 140 to ensure that all data leaving the security boundary of the customer SOTA 109 has been sanitized/downgraded to the appropriate security domain.

According to one or more embodiments, the build system is an external system that supplies the software update to the supplier SOTA 110 for crating. This system is external to the SOTA system.

According to one or more embodiments, the customer authentication system is an external system that interfaces with the customer SOTA 109 to provide user authentication validation services 210 which will be used to control access to the customer SOTA 109 and its functionality.

According to one or more embodiments, the SMD 101 is an external subsystem that resides at the CPS platform along with the customer SOTA 109 and CPS devices 104. The purpose of the SMD in the SOTA system is for receiving update packages from the customer SOTA 109 and then being connected directly to individual CPS devices 104 and installing the update on them.

According to one or more embodiments, the CPS device 104 is a subsystem that resides at the CPS platform along with the customer SOTA 109 and SMD 101. Running on the CPS device is a receive process whose purpose is to listen on the SASH network for a secure connection request from the customer SOTA 109 or to the CPS's configuration port for a direct connection from the SMD. Once a connection is made, the process will receive the update package, verify the authenticity and integrity of the package, and store it in protected memory on the CPS until the installation process is triggered on the CPS.

According to one or more embodiments, the Remote Attestation Server 220 is an external trusted server that can objectively assess the health of the supplier and customer SOTAs.

Figure 3:
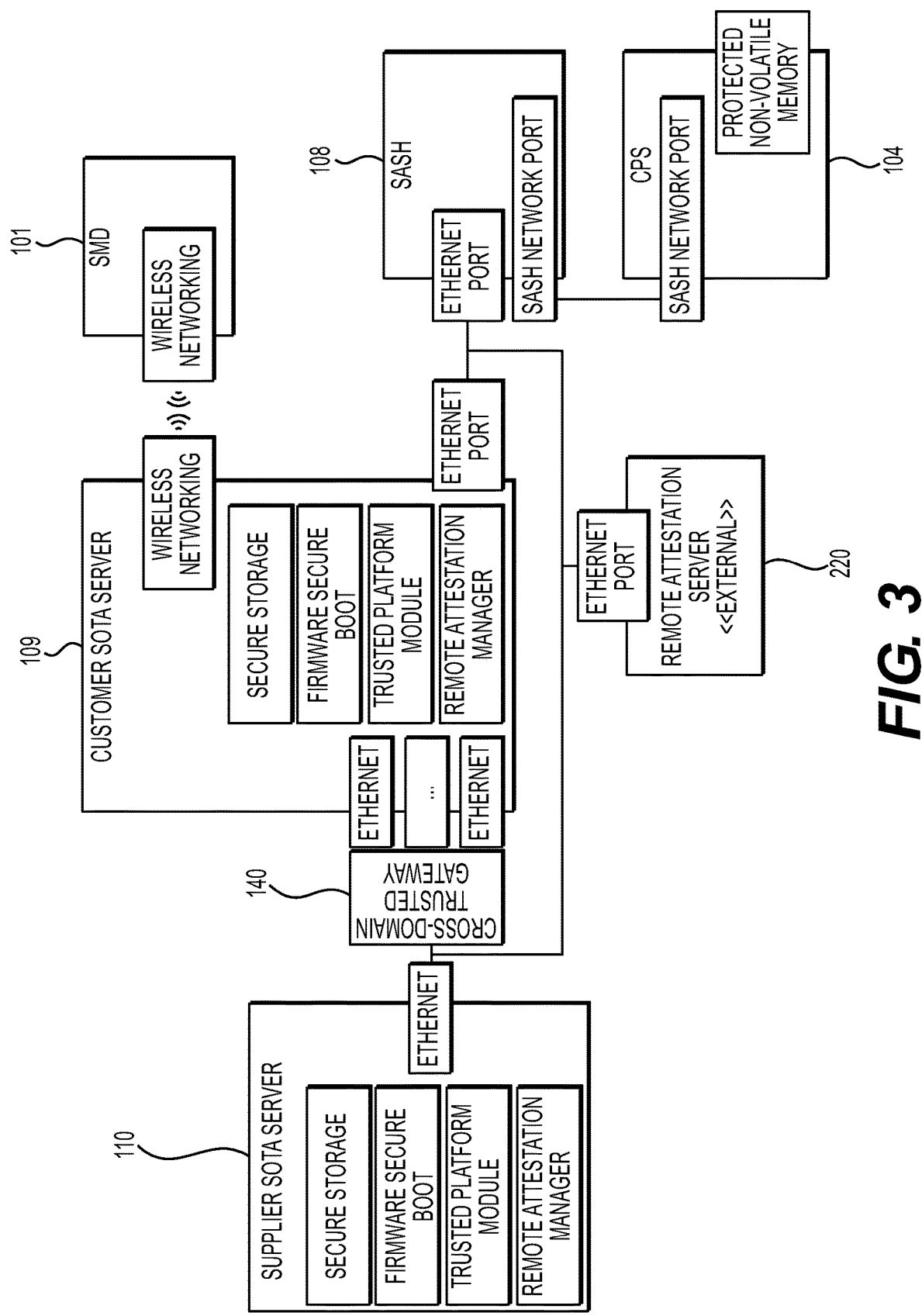
FIG. 3 depicts an example SOTA System Physical View, according to one or more embodiments.

FIG. 3 depicts an example SOTA System Physical View, according to one or more embodiments. The SOTA system physical architecture includes three components: the supplier SOTA Server 110, The customer SOTA Server 109, and The CPS Devices 104. The customer SOTA server 109 and CPS Devices are connected together via the SASH network 108, an external system, and thus need to each have an appropriate port to connect to the SASH network. The supplier SOTA servers 110 and the customer SOTA server 109 sit in separate locations and connect to each other via the Internet, requiring at least one Ethernet port in each server.

According to one or more embodiments, the supplier SOTA server 110 is a computing platform with network connectivity and Internet reachability. The supplier SOTA server hosts and prepares the update packages for distribution to the customer SOTA server 109 and, ultimately, the CPS devices. The subsystems required to the supplier SOTA hardware follow.

According to one or more embodiments, the server will be required to have Secure Boot capabilities that ensure the computer runs only trusted software on startup, helping to protect the system from rootkits, bootkits, and other malware.

According to one or more embodiments, the attestation manager is the mechanism on the supplier SOTA that gathers data used to prove the trustworthiness of the SOTA and has the data signed by the trusted platform manager before sending it to the external remote attestation server for verification.

According to one or more embodiments, the server will need a hardware root of trust outside of any that are required for the Secure Boot system. This root of trust will be used to securely store private keys for the supplier SOTA and compute signatures using those keys.

According to one or more embodiments, the server will need to have a secure storage volume that is used to securely store sensitive information such as CPS updates when at rest.

According to one or more embodiments, the server will require at least one Ethernet network interface to communicate with the customer SOTA 109.

According to one or more embodiments, the customer SOTA server 109 is a computing platform that is ruggedized as necessary. The customer SOTA server 109 may be capable of running a Type 1 hypervisor that hosts up to a predetermined number of virtual SOTA server machines concurrently. The customer SOTA server 109 may also have Internet connectivity via at least one NIC (multiple NICs may be employed to enhance network separation between virtual machines) for connectivity to the supplier SOTA systems. Additionally, it may have an appropriate port to allow connection to the SASH and port for connection to an SMD.

According to one or more embodiments, the server may be required to have Secure Boot capabilities that ensure the computer runs only trusted software on startup, helping to protect the system from rootkits, bootkits, and other malware.

According to one or more embodiments, the attestation manager is the mechanism on the supplier SOTA that gathers data used to prove the trustworthiness of the SOTA and has the data signed by the trusted platform manager before sending it to the external remote attestation server for verification.

According to one or more embodiments, the server will need a hardware root of trust outside of any that are required for the Secure Boot system. This root of trust will be used to securely store private keys for the customer SOTA and compute signatures using those keys.

According to one or more embodiments, the server will need to have a secure storage volume that is used to securely store sensitive information such as CPS updates when at rest.

According to one or more embodiments, the server will require at least one Ethernet network interface to communicate with the supplier SOTA. This may come from multiple network interface cards, with each card dedicated to a particular virtualized machine or in the form of a secure network interface group which provides for network separation without dedicating an interface to a given virtual machine.

According to one or more embodiments, the customer SOTA server 109 will also require at least one network interface to communicate with the SASH 108. This does not restrict network interfaced to just Ethernet interfaces, other networking connections such as Profinet® or serial connections may be employed at the customer SOTA to connect to the SASH and CPSs.

According to one or more embodiments, the CPS hardware as a whole is beyond the scope of this document. However, the hardware may have one port for connectivity to the customer SOTA 109 via the SASH and a configuration port for direct connection to an SMD. Additionally, the hardware may allocate a predetermined amount of MB of protected non-volatile memory for storage of the update package prior to installation.

According to one or more embodiments, the CPS may require at least one fiber optic network interface (e.g., Profinet®) to communicate with the customer SOTA via the SASH. Note that this does not restrict the CPS to just Profinet®; other network interfaces, including, but not limited to CAN bus, Modbus®, Ethernet, or RS485 may be used for communications with the SASH and customer SOTA.

According to one or more embodiments, the CPS will have a reserved portion of protected non-volatile memory in which to store the received update upon successful decryption and authentication. The update may be stored in this protected memory until the install process is manually initiated by and authorized end user.

FIGS. 4-7 show the logical components of the SOTA and their relationships, according to one or more embodiments. The SOTA is a system for preparing and securely distributing updates for a number of CPS devices that may come from a number of different vendors. The system is comprised of a number of processes running on two different SOTA servers, as well as receiving processes on the CPS devices as well as on the Secure Management Devices which may be used to install updates to certain CPSs in special circumstances.

Figure 4:
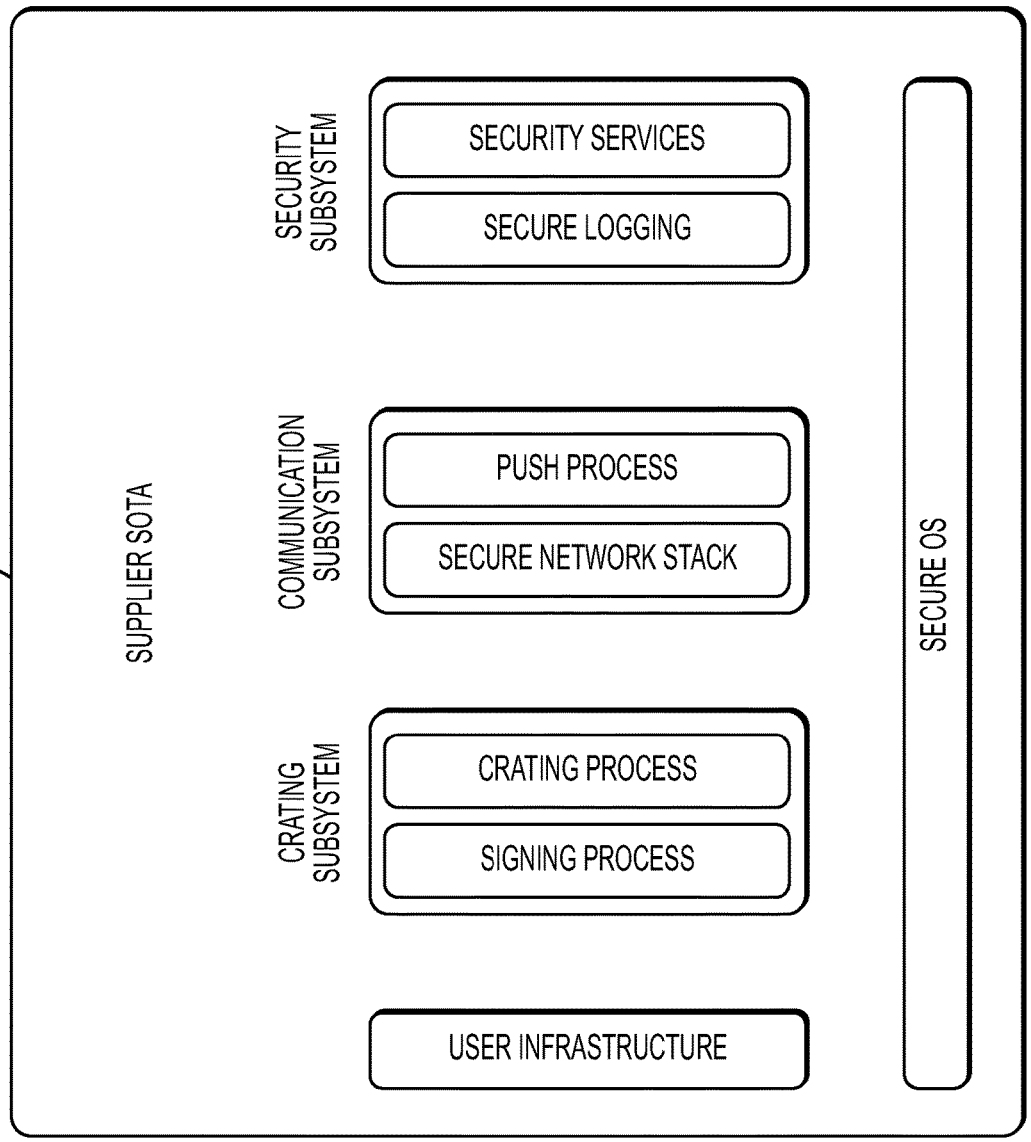
FIG. 4 depicts an example logical view of the supplier SOTA System, according to one or more embodiments.

FIG. 4 depicts an example logical view of the supplier SOTA System, according to one or more embodiments. The supplier SOTA Software includes one or more of the following components.

According to one or more embodiments, the supplier SOTA will be running a security enhanced operating system such as SELinux to provide access control, security policies and enforcement, and privilege minimization. This Operating system will underlie the entire supplier SOTA system.

According to one or more embodiments, the supplier SOTA user Infrastructure provides the user interface to the system, available following vetting by the authentication process, which ensures only authorized users are allowed to log onto the system customer SOTA, and that authenticated users are only allowed access to the resources that their role grants them. Within this user infrastructure, authorized users will access the various other subsystems of the supplier SOTA such as the crating subsystem, the communication subsystem, or the system or security logs.

According to one or more embodiments, the supplier SOTA Crating subsystem provides the functionality for an authorized user to process the updates that are provided by the build system and prepare them for transmission to the customer SOTA.

According to one or more embodiments, the SOTA packaging process is the subsystem that receives the update data from an external build system and prepares the update to be pushed securely to the customer SOTA. The crating procedure is based on a modified version of the ARINC 827 Electronic Distribution of Software by Crate standard. This process interacts with the logging process to capture any failures or errors arising from the packaging process. When the packaging is complete the process can interact with the push process to begin the transfer of the update package to the customer SOTA. The final step of the crating process, prior to transmission is to encrypt the crate itself using a key known to the customer SOTA for another layer of protection during transmission.

As a part of the crating process the system will use a method to provide authentication of the update contents for the customer SOTA. In this method, integrity tags for the individual components of the crate are stored within the crate manifest file and the manifest is them digitally signed, providing authentication of the manifest file and its contents. This signature will be created by the signing process in conjunction with the hardware root of trust.

According to one or more embodiments, the push process is the subsystem that initiates the creation of a secure connection across whatever network connects the two SOTA systems, such as the Internet, to the desired customer SOTA and then transfers the packaged update to the customer SOTA. This process will interact with the network stack on the supplier SOTA transmit the package across the secure connection. It also interacts with the logging process to record any errors or significant information.

According to one or more embodiments, the networking stack on the supplier SOTA is the subsystem that actually establishes the secure connection across the internet to the with the networking stack on the desired customer SOTA and then manages the secure transfer the packaged update to the customer SOTA. It may also interact with the logging process to record any errors or significant information. The networking stank may use IPSec for its security layer, tailoring the suite of algorithms available for use to those contained in a cryptography suite, with further tailoring available to the set of algorithms allowed by the customer.

According to one or more embodiments, the SOTA authentication process is the subsystem that acts as a gatekeeper to the supplier SOTA system. It allows access to the system only to those users with the appropriate credentials and allows the system to restrict access to various parts of the system to those users with proper authorization. It interacts with the logging process to log successful and unsuccessful authorization attempts.

According to one or more embodiments, the logging process is the subsystem that receives logging requests from the other processes in the system and records the included information in the appropriate log file. It will also manage access to the log files, restricting access to only those roles that are authorized to perform actions on those files such as reading or writing to the logs.

According to one or more embodiments, the supplier SOTA will be running a security enhanced operating system to provide access control, security policies and enforcement, and privilege minimization. This Operating system will interact with the customer's authentication system to provide access to the user subsystem, which is primarily an interface to the Type 1 hypervisor that is managing the virtualized environments. The virtualization system may be a secure OS providing access a vSphere client which interacts with a VMWare ESXi server.

Figure 5:
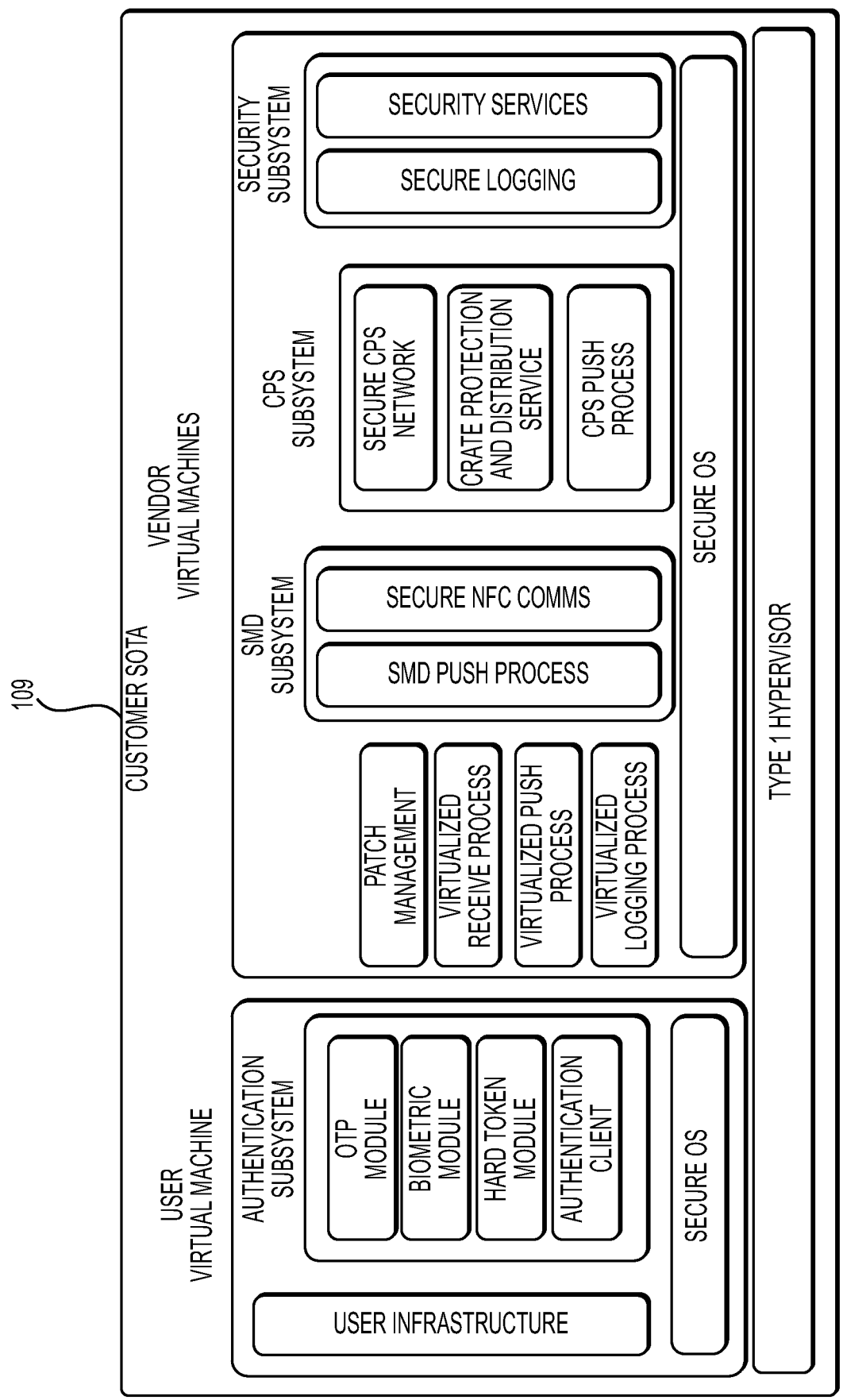
FIG. 5 depicts an example logical view of the customer SOTA System, according to one or more embodiments.

FIG. 5 depicts an example logical view of the customer SOTA System, according to one or more embodiments. The user infrastructure will be used primarily for configuration and maintenance of the virtualization system.

According to one or more embodiments, the customer SOTA VM Interface will provide authorized users access to the virtualized SOTA instances that correspond to individual CPS suppliers. There will be one virtualized SOTA for each supplier.

According to one or more embodiments, the SOTA authentication process is the subsystem that acts as a gatekeeper to the customer SOTA system. It allows access to the system only to those users with the appropriate multi-factor credentials and allows the system to restrict access to various parts of the system to those users with proper authorization. It interacts with the logging process to log successful and unsuccessful authorization attempts.

According to one or more embodiments, the OTP authentication module is one of the multi-factor authentication modules that will be used for gating access to the customer SOTA. It will use a time-based one-time password (TOTP) system that satisfies the "something you know" portion of the multi-factor triad.

According to one or more embodiments, the Biometric authentication module is one of the multi-factor authentication modules that will be used for gating access to the customer SOTA. It will use a biometric feature, such as facial recognition or fingerprint scanning in order to satisfy the "something you are" portion of the multi-factor triad.

According to one or more embodiments, the hard token authentication module is one of the multi-factor authentication modules that will be used for gating access to the customer SOTA. It will use a hard token item such as a smart card or an RFID proximity device that satisfies the "something you have" portion of the multi-factor triad.

According to one or more embodiments, the authentication client is the process that interacts with the multifactor modules and the customer's authentication system to verify if the factors presented to it belong to an authorized user, uses that information along with the user's identity to grant access to the system based on the user's role.

According to one or more embodiments, the customer SOTA Virtualization Subsystem is the subsystem that contains the Type 1 hypervisor and the virtualized SOTA environments.

According to one or more embodiments, the hypervisor on the customer SOTA is the subsystem that will manage many virtualized customer SOTA machines. This will allow for multiple suppliers to push updates to their end devices on a single platform while ensuring that their system information and update contents remain isolated from other suppliers' processes and information. Each of the virtual SOTA machines managed by the hypervisor will employ Receive, Push, and Logging processes. The customer SOTA hypervisor interacts with the networking stack on the customer SOTA and with the receiving process inside the appropriate virtual machine.

According to one or more embodiments, the virtualized SOTA receive process is the subsystem that receives the packaged update from the supplier SOTA, verifies the authenticity of the update, and stores the update for further processing by the Crate Protection and Distribution Service. It interacts with the networking stack on the customer SOTA to receive the update. It also interacts with the logging process to record and errors or significant information.

According to one or more embodiments, the virtualized SOTA push process is the subsystem that distributes the update package to the appropriate set of CPS devices on the platform via the SASH network or to store the update package on a connected and authenticated Secure Maintenance Device for direct installation on certain CPSs under special circumstances.

According to one or more embodiments, the virtualized logging process is the subsystem contained within each of the virtualized SOATA machines that receives logging requests from the other processes in the virtual machine and records the included information in the appropriate log file for future analysis. It will also manage access to the log files, restricting access to only those roles that are authorized to perform actions on those files such as reading or writing to the logs.

IG. 6 depicts an example logical view of the SMD Portion of the SOTA System, according to one or more embodiments. The SOTA SMD Subsystem is a subsystem residing on each of the virtualized SOTA environments that interact with the SMD for the purpose of pushing updates to an SMD device for later manual transfer to a CPS device.

According to one or more embodiments, the secure NFC communication stack is a modified networking stack that adds IPSec protection to the NFC data-link and physical layers, allowing for secure and authenticated communications using NFC technology.

According to one or more embodiments, the SMD push process is the process that will initiate a secure connection with an SMD device via NFC and send any update crates to the SMD that are ready for manual installation on CPS devices.

Figure 7:
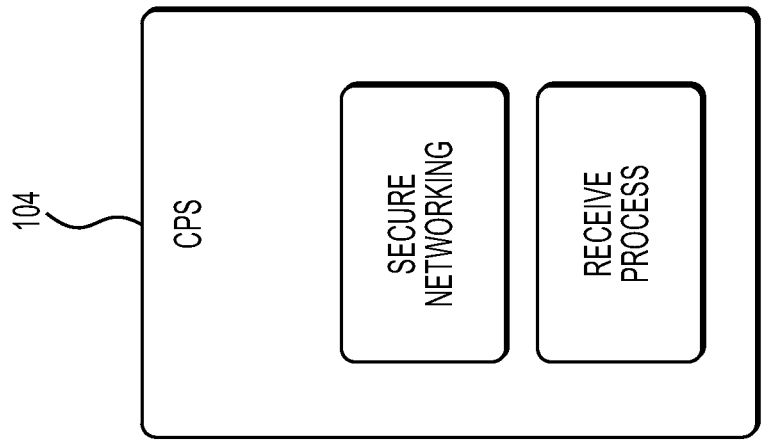
FIG. 7 depicts an example logical view of the CPS portion of the SOTA System, according to one or more embodiments.
Figure 6:
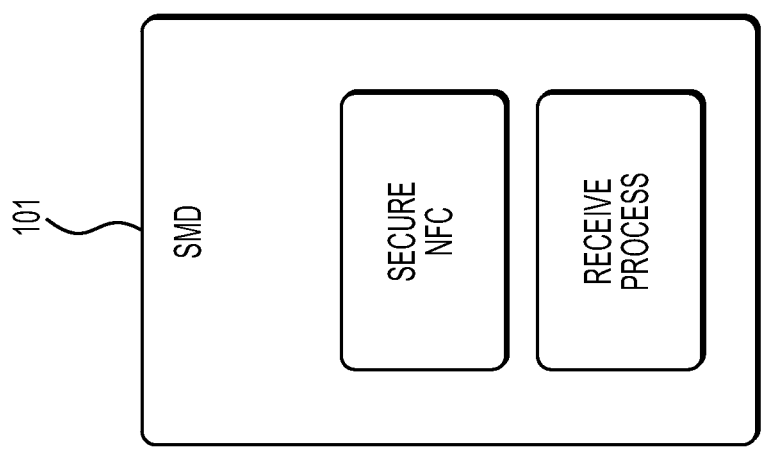
FIG. 6 depicts an example logical view of the Secure Maintenance Device (SMD) portion of the SOTA System, according to one or more embodiments.

FIG. 7 depicts an example logical view of the CPS Portion of the SOTA System, according to one or more embodiments. The SOTA SMD Subsystem is a subsystem residing on each of the virtualized SOTA environments that interact with the SASH for the purpose of pushing updates to a set of CPS devices and to later manually initiate the installation of those updates.

According to one or more embodiments, the CPS secure communication stack is an IPSec enabled networking stack that provides confidentiality, integrity, and authentication protection to the communications with the SASH which will then route this IPSec protected traffic over a network interface including but not limited to Profinet® to the specified set of CPS devices.

According to one or more embodiments, the crate protection and distribution service take the crates that are received by the virtualized Receive Process and prepares them for secure distribution to the CPS devices. Distribution may be managed by implementation of a modified version of the Uptane software update standard which determines which end devices need to receive which updates. These updates will then be encrypted with an ephemeral encryption key which will then be encrypted by a series of keys chosen using LKH or other tree-based broadcast encryption methods which will allow only a specified set of CPSs to decrypt the crated software update for further processing and eventual install. This will ensure that the contents of an update are never known to unauthorized CPS devices.

According to one or more embodiments, the CPS Push process is the process that takes the protected crate, and the set of CPS destinations and establishes a secure connection via the SASH to those CPS devices for transmission to the receiving process running on those cyber-physical systems.

According to one or more embodiments, the SOTA authentication process is the subsystem that acts as a gatekeeper to the virtualized customer SOTA system. It allows access to the system only to those users with the appropriate credentials and allows the system to restrict access to various parts of the system to those users with proper authorization; the security services will be able to make use of single-sign-on capabilities and integrate with the customer's authentication system for determining access to the system. It interacts with the logging process to log successful and unsuccessful authorization attempts. The security services also provide malware scanning and other network defense measures.

According to one or more embodiments, the logging process is the subsystem that receives logging requests from the other processes in the system and records the included information in the appropriate log file for future analysis. It will also manage access to the log files, restricting access to only those roles that are authorized to perform actions on those files such as reading or writing to the logs.

According to one or more embodiments, the secure NFC communication stack is a modified networking stack that adds IPSec protection to the NFC data link and physical layers, allowing for secure and authenticated communications with the customer SOTA server 109 using NFC technology.

According to one or more embodiments, the SMD receive process is a subsystem that resides on the Secure Maintenance Devices that receives and stores an update package sent to it from the push process in one of the virtualized SOTA machines. This SMD can later be directly connected to a CPS to perform a direct installation of the update on the CPS under special circumstances.

According to one or more embodiments, the secure network communication stack is a modified networking stack that adds IPSec protection to network communication protocols, including, but not limited to the Profinet® data link and physical layers, allowing for secure and authenticated communications with the customer SOTA server 109 via the SASH using IPSec to protect the connection to the CPS receive process.

According to one or more embodiments, the CPS receive process is a subsystem running on each of the CPS devices that listens on the SASH network for a connection from a virtualized SOTA machine's push process and establishes a secure connection across the SASH network with that process. Once a secure connection has been established, the CPS receives process verifies the authenticity of the update package and stores it in secure memory for later installation.

Figure 8:
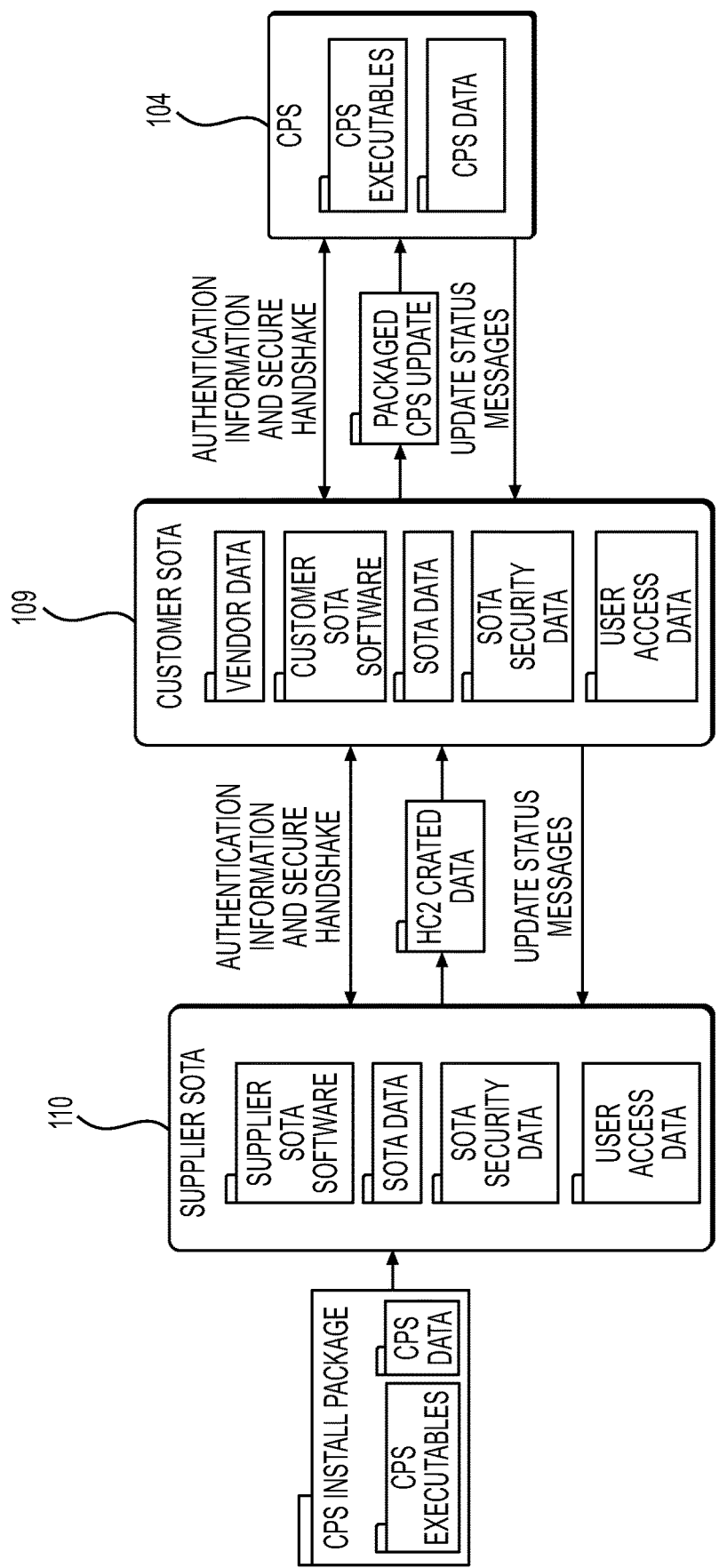
FIG. 8 depicts an example SOTA System Data Flow, according to one or more embodiments.

According to one or more embodiments, the SOTA system makes use of many pieces of data, some of which reside on individual components and some of which flow throughout the system, primarily the packaged updates. FIGS. 8 and 9 show the data flow and formats seen in the system.

FIG. 8 depicts an example SOTA System Data Flow, according to one or more embodiments. As illustrated in FIG. 8, Modbus®, the SOTA software, data, and security data reside on the supplier and customer servers, while the data that passes through the system is the packaged CPS updates, which flow from supplier SOTA to customer SOTA, and eventually to the CPS; the authentication and security handshake data that allow secure connections to be set up between the supplier SOTA and the customer SOTA and between the customer SOTA and the CPS; and messages regarding the status of the CPS update procedure which flow from the CPS to the customer SOTA and out to the supplier SOTA. The description of this data follows below.

Figure 9A:
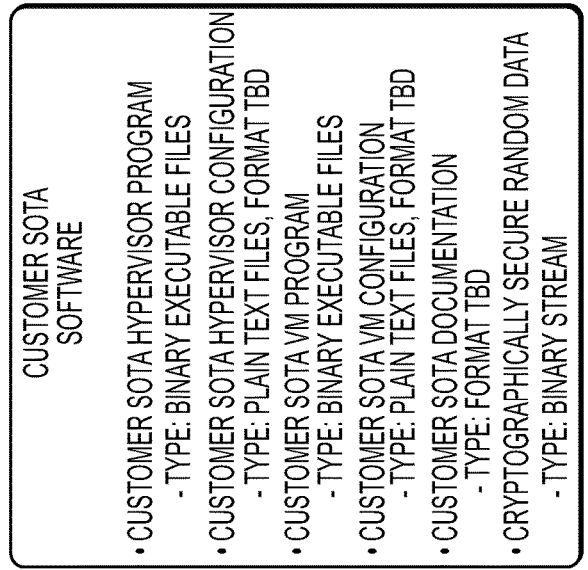
FIGS. 9A-9E depict example SOTA System Data, according to one or more embodiments.

FIGS. 9A-9E depict example SOTA System Data, according to one or more embodiments. The CPS Install package illustrated in FIG. 9A is the collection of data that is given to the supplier SOTA by the external build system to be prepared for transmission to and installation on some specified set of CPS devices located on some specified CPS platform. The package contents may include some combination of binary executables and libraries, data files and configuration files and update documentation and will be a mixture of binary and plain text files.

As a part of the processing of the install package, a manifest file in XML format will be generated, and the entire package, including the manifest will be compressed and encrypted, creating a single binary file to be sent to the customer SOTA.

Figure 9B:
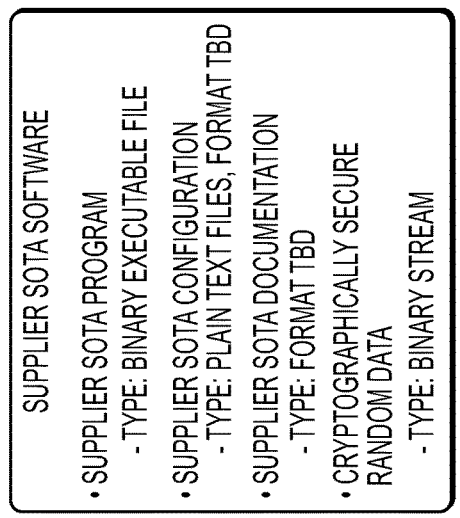

According to one or more embodiments, the supplier SOTA software illustrated in FIG. 9B is the collection of data and executable files that make up the supplier SOTA server application suite, including the packaging process, authentication process, push process, etc. The software contents may include some combination of binary executables and libraries, data files and configuration files and update documentation and will be a mixture of binary and plain text files. Additionally, the supplier SOTA software will require the use of a source of cryptographically strong random bits.

Figure 9C:
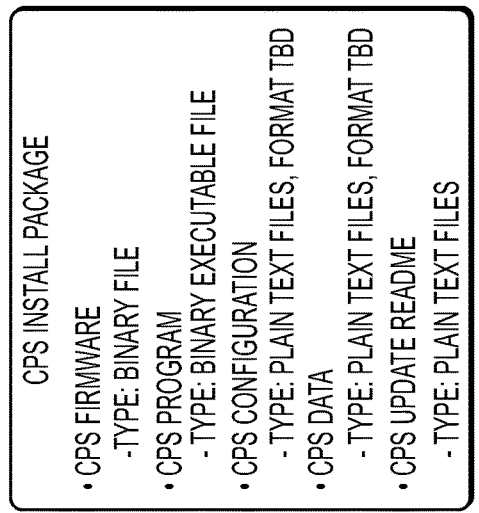

Like the supplier SOTA software, the customer SOTA software illustrated in FIG. 9C is the collection of data and executable files that make up the customer SOTA server 109 application suite. However, unlike the supplier SOTA, the package will include the hypervisor executables, libraries, and configuration & data files as well as a collection of executables, libraries, and configuration & data files for each of the virtual machines running under the hypervisor. The software contents may include some combination of binary executables and libraries, data files and configuration files and update documentation and will be a mixture of binary and plain text files. Additionally, the customer SOTA software may require the use of a source of cryptographically strong random bits.

Figure 9D:
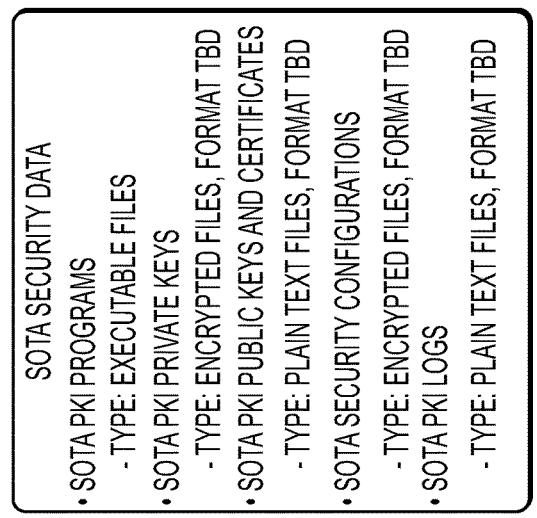

According to one or more embodiments, the SOTA data illustrated in FIG. 9D is the collection of data that is generated or modified on the SOTA system. This data includes log files, configuration files, and security configuration files. The data contents may include a mixture of binary and plain text files with predetermined formats.

Figure 9E:
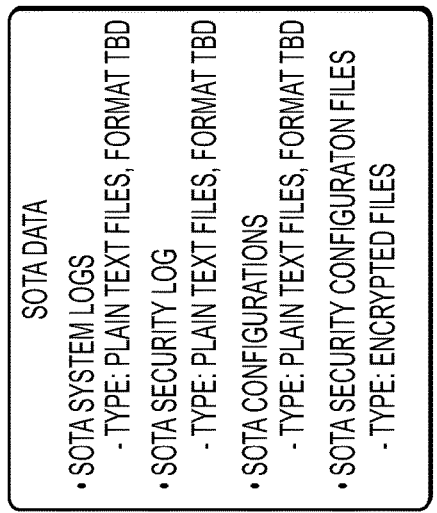

According to one or more embodiments, the SOTA security data illustrated in FIG. 9E is the data that is required by the system to enable its secure communications and operations. This data includes authentication data, public key infrastructure (PKI) executable software, PKI keys and certificates, security configuration files, and security log files.

FIGS. 10-13 depict SOTA Assets and Security Objectives, according to one or more embodiments. The Secure Boot and Trusted Platform Module on the server may ensure the computer runs only trusted software on startup, helping to protect the system from rootkits, rootkits, and other malware.

According to one or more embodiments, a hardware root of trust, outside of any that are required for the Secure Boot system, may be employed by the server. This root of trust will be used to securely store private keys for the supplier SOTA and compute signatures using those keys. This will protect against attacks where the private key is leaked and unauthorized parties can send potentially malicious updates while posing as a valid supplier.

According to one or more embodiments, the supplier SOTA will make use of secure storage to protect the sensitive information on the system, including the update packages it receives from the build system, while the data is at rest.

Figure 10:
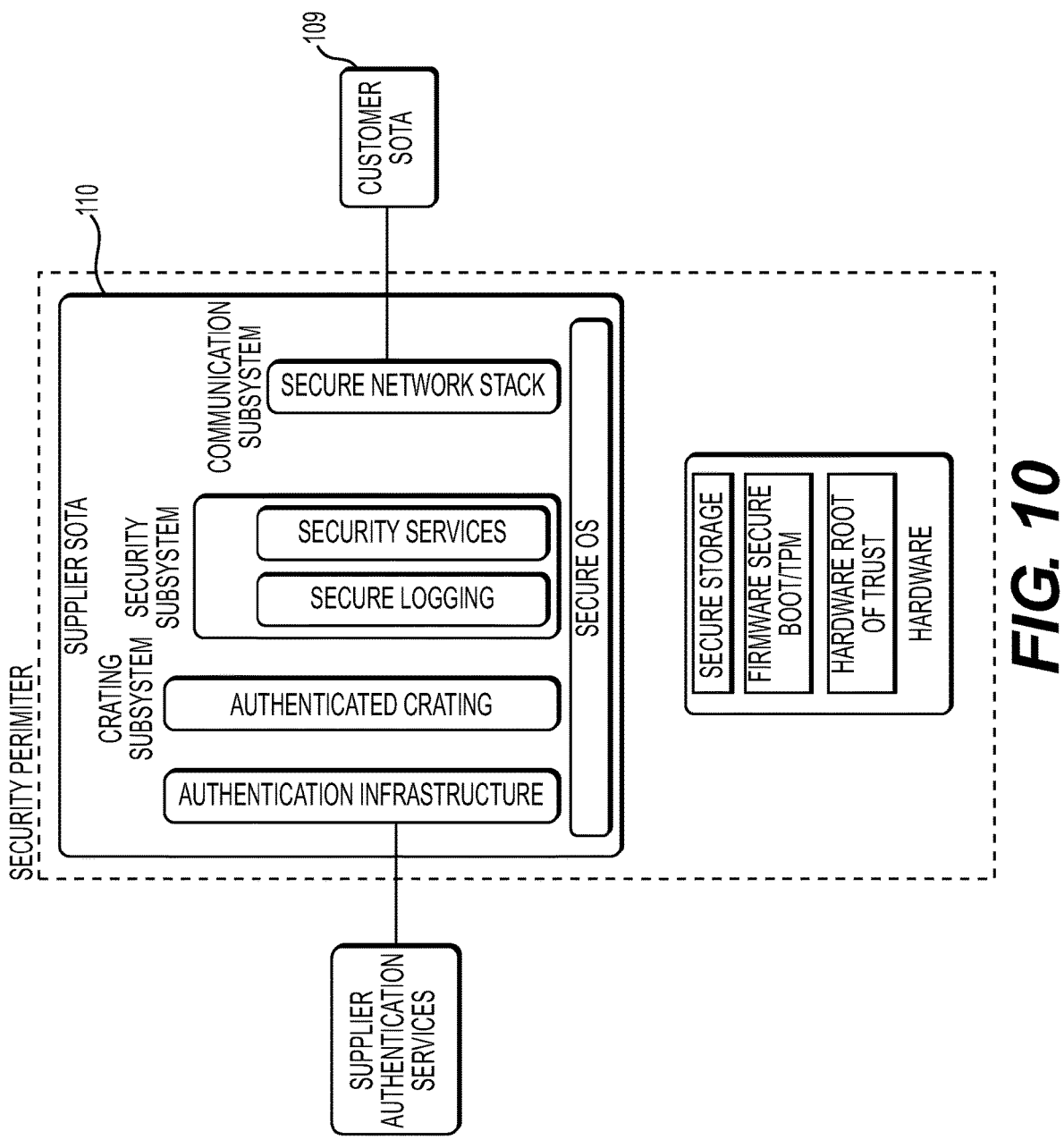
FIG. 10 depicts example supplier SOTA Assets and Security Objectives, according to one or more embodiments.

As illustrated in FIG. 10, according to one or more embodiments, the supplier SOTA's authentication infrastructure will interface with the supplier's enterprise authentication system to govern access to the system, ensuring only authorized users are able to access the system.

According to one or more embodiments, the supplier SOTA will make use of the hardware root of trust to protect the private keys used to sign the CPS update packages, providing source authentication and non-repudiation properties for the updates as they cross the security perimeter to the customer SOTA.

According to one or more embodiments, the supplier SOTA Security Subsystem performs many important security duties, among them are the role-based access control that ensures only authorized users are able to perform sensitive operations, and logging of security-related information, managing system security parameters.

According to one or more embodiments, the supplier SOTA will employ IPSec with a tailored set of algorithms to establish a secured network link with the customer SOTA for the protection of all communications between the two systems.

According to one or more embodiments, the Secure Boot and Trusted Platform Module on the server will ensure the computer runs only trusted software on startup, helping to protect the system from rootkits, rootkits, and other malware.

According to one or more embodiments, the supplier SOTA's authentication subsystem will interface with the supplier's enterprise authentication system to govern access to the system, ensuring only authorized users are able to access the system.

Figure 11:
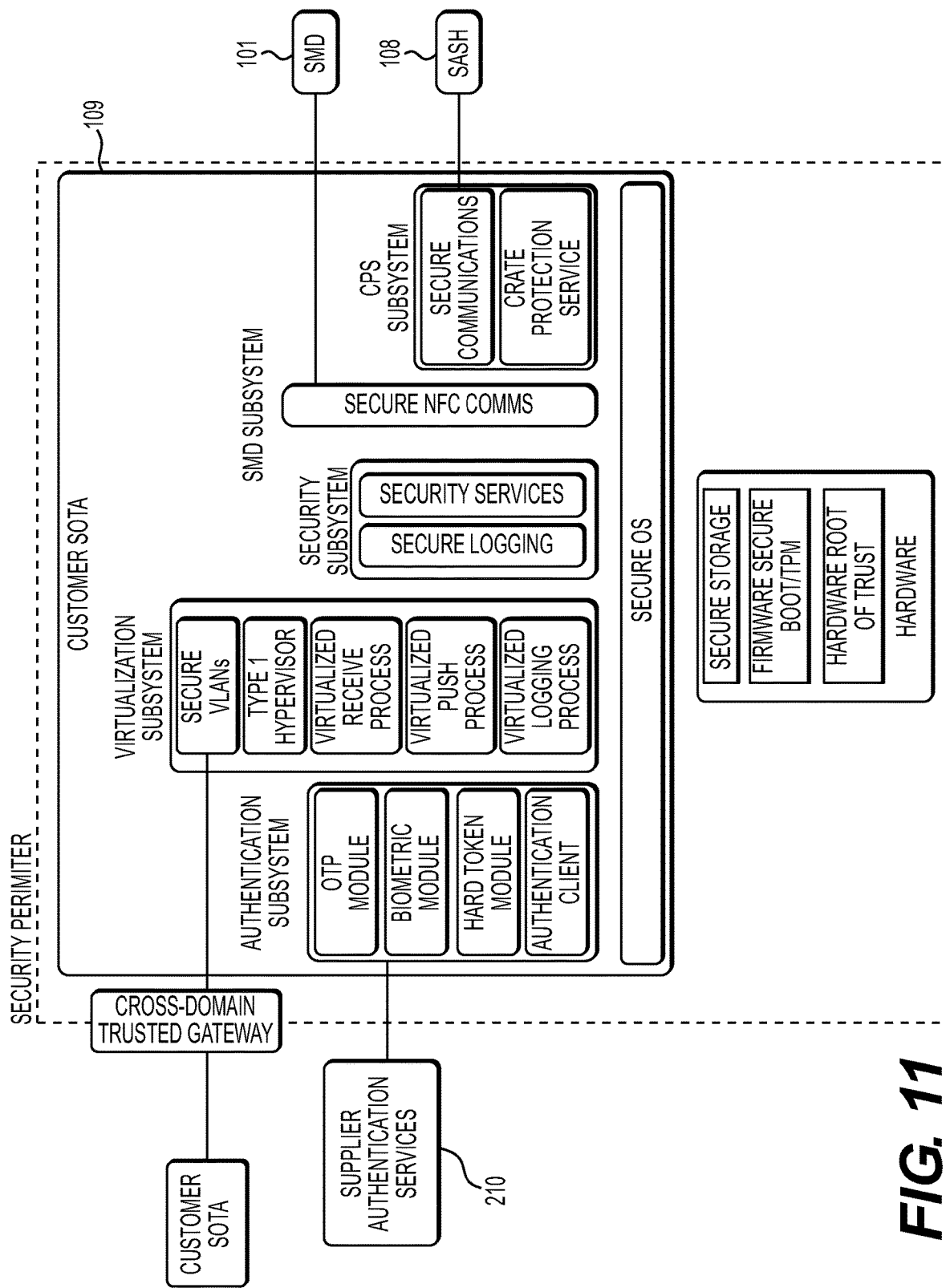
FIG. 11 depicts example customer SOTA Assets and Security Objectives, according to one or more embodiments.

As illustrated in FIG. 11, according to one or more embodiments, the authentication subsystem will support multi-factor authentication and will supply single-sign-on capabilities for the various components of the customer SOTA, including the Virtual Machine Interface, the virtualization host, and the Virtual Machines themselves.

According to one or more embodiments, the Type 1 hypervisor on the customer SOTA will provide process and data separation for multiple suppliers which may push updates to their end devices on a single customer platform, ensuring that system information and update contents remain isolated from other suppliers' processes and information. Each of the virtual SOTA machines managed by the hypervisor will employ Receive, Push, and Logging processes. The customer SOTA hypervisor interacts with the networking stack on the customer SOTA and with the receiving process inside the appropriate virtual machine.

According to one or more embodiments, the CPS update crates received by the customer SOTA require further preparation for secure distribution to the CPS devices. The crates will be encrypted with an ephemeral encryption key which will then, in turn, be encrypted by a series of keys chosen using LKH or other tree-based broadcast encryption methods which will allow only the specified set of CPSs selected to receive the update to be able to decrypt the crated software. This ensures that the contents of an update is never known to unauthorized CPS devices and that an unauthorized party without knowledge of the keying tree material cannot create phony crates to be installed by the CPSs.

According to one or more embodiments, the customer SOTA and SMD standard NFC communication stack will be replaced with a modified networking stack that adds IPSec protection to the NFC data link and physical layers. Adding IPsec to the NFC communication path will allow for secure and authenticated communications between the customer SOTA server 109 and SMD using NFC technology.

According to one or more embodiments, the communications between the security perimeters of the customer SOTA and the SASH will be protected using IPSec to set up confidential and authenticated channels between the two devices. Similarly, IPSec will be used to establish confidential and authenticated channels between the SASH and the CPSs. Depending on the network technology used by the CPSs this may require modifying the networking stack to add an IPSec layer above the data-link layer. The SASH will then act as a bridge, decapsulating the Ethernet traffic from the SOTA and re-encapsulating it for the network protocol used by the CPS and sending it across the IPSec secured channel.

According to one or more embodiments, the customer SOTA will employ a cross-domain guard to ensure that all data leaving the security boundary of the customer SOTA has been sanitized/downgraded to the appropriate security domain.

According to one or more embodiments, the CPS device will make use of protected non-volatile memory to securely store the software updates it receives from the customer SOTA until the installation is manually initiated by an authorized end user.

According to one or more embodiments, the supplier SOTA and customer SOTA exist in one or more of the following states: install/configure; shutdown; login; and/or logoff.

Figure 12:
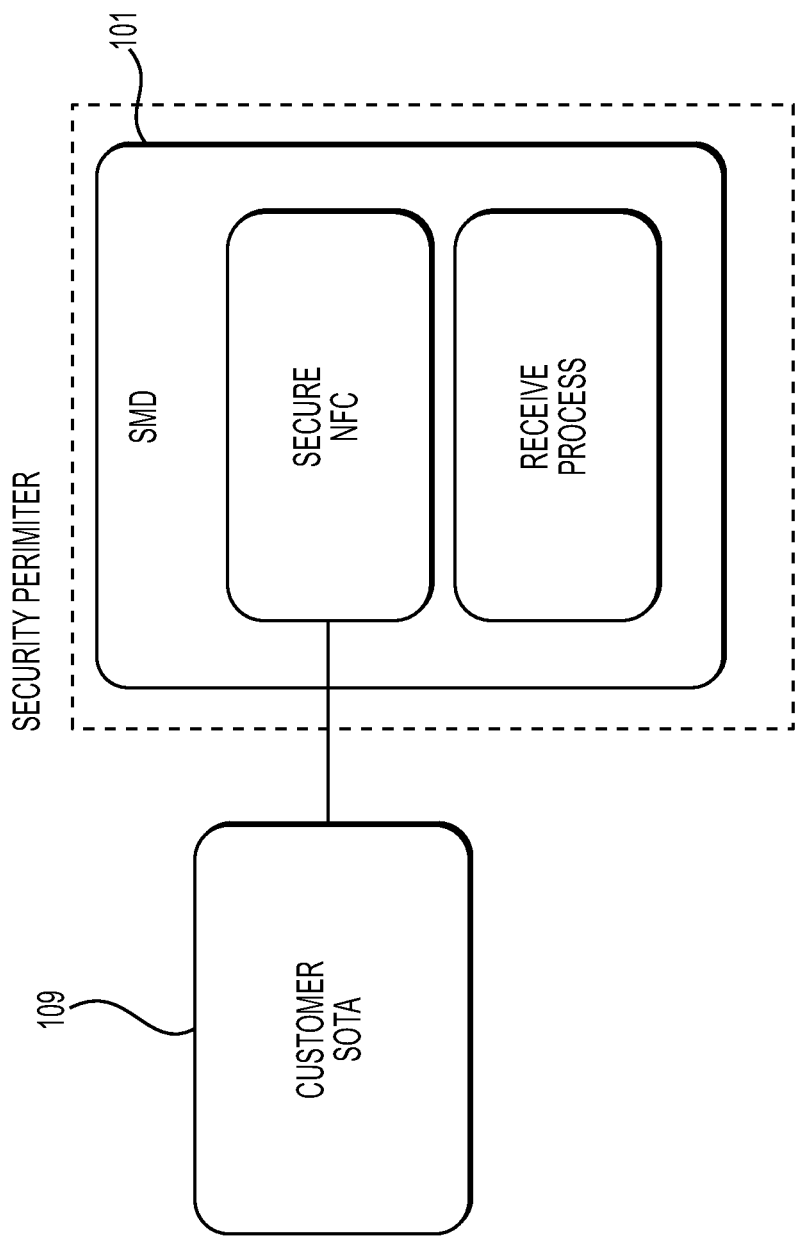
FIG. 12 depicts example SMD Portion of SOTA Assets and Security Objectives, according to one or more embodiments.
Figure 13:
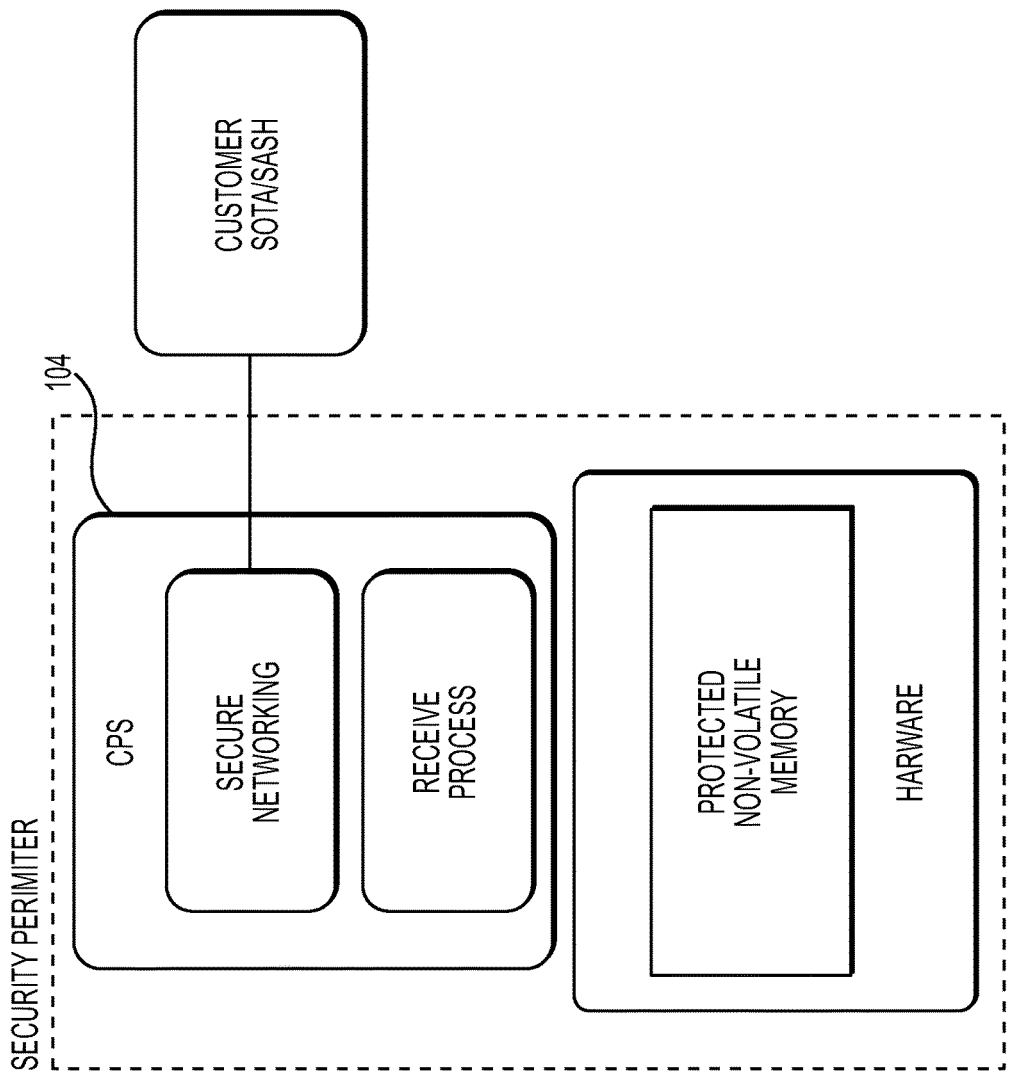
FIG. 13 depicts an example CPS Portion of SOTA Assets and Security Objectives, according to one or more embodiments.

FIG. 12 depicts example SMD Portion of SOTA Assets and Security Objectives, according to one or more embodiments. FIG. 13 depicts an example CPS Portion of SOTA Assets and Security Objectives, according to one or more embodiments. According to one or more embodiments, the SOTA receive processes on the SMD and CPS exist in one or more of the following states: install/configure; shutdown; receive; and/or idle/listen.

According to one or more embodiments, the states of these individual subsystems can vary independently of each other; however, if either the SMD or CPS receive process are in the receive state, the customer SOTA may be in the login state.

Additionally, on the supplier SOTA, the user Infrastructure and Crating Subsystem are only active then the SOTA is in the login state. On the customer SOTA, the user subsystem, SMD subsystem, and CPS Subsystem are only active when the SOTA is in login state. The customer SOTA can only transfer data to the SMD or CPS Device after it has received and processed all of the CPS data, including authenticating the source of the data and scanning it for malware. On the CPS, the listening process will be waiting for a connection from the customer SOTA, which indicates that it has an update to push to the CPS. This will lead the CPS to return back to the receive state where the customer SOTA may push the update to the CPS. Once the update is received and validated the CPS stores it in protected non-volatile memory and returns to the listening state. The installation of the update does not take place until it is manually initiated by an authorized user.

According to one or more embodiments, the SOTA has four main components: supplier SOTA systems, the customer SOTA system, a receive process on the SMD, and/or a receive process and network stack on the CPS devices.

Multiple CPS suppliers may host their own instances of a supplier SOTA subsystem, and these can all connect and communicate with a single customer SOTA deployed at the customer site.

According to one or more embodiments, the customer SOTA will connect at communicate with the CPS devices at the customer's site via the SASH. The customer SOTA will push the updates to the CPS over the network managed by the SASH.

Additionally, the SOTA can be connected to the SMD to push CPS update package, for later manual installation on selected CPS devices.

TABLE 1

Traceability matrix

| Identifier | Description | How met type |
| --- | --- | --- |
| SOTA-FUNC-001 | Log in to SOTA. | Architect |
| SOTA-FUNC-002 | Log out of SOTA. | Architect |
| SOTA-FUNC-003 | Prepare update for push. | Architect, trade, invent |
| SOTA-FUNC-004 | Notify infrastructure of upcoming update. | Architect |
| SOTA-FUNC-005 | Establish secure connection with customer SOTA. | Architect, trade |
| SOTA-FUNC-006 | Receive confirmation of update status. | Architect |
| SOTA-FUNC-007 | Install SOTA. | Architect |
| SOTA-FUNC-008 | Maintain the SOTA System. | Architect |
| SOTA-FUNC-009 | View system logs. | Architect |
| SOTA-FUNC-010 | Copy system logs. | Architect |
| SOTA-FUNC-011 | Delete system logs. | Architect |
| SOTA-FUNC-012 | Establish access privileges. | Architect |
| SOTA-FUNC-013 | Maintain the SOTA security parameters/PKI. | Architect |
| SOTA-FUNC-014 | View system security logs. | Architect |
| SOTA-FUNC-015 | Copy system security logs. | Architect |
| SOTA-FUNC-016 | Delete system security logs. | Architect |
| SOTA-FUNC-017 | Enable the end user to visually verify integrity and authentication of update. | Architect, trade, invent |
| SOTA-FUNC-018 | Establish secure connection with CPS. | Architect, trade, invent |
| SOTA-FUNC-019 | Push Update to CPS. | Architect |
| SOTA-FUNC-020 | Upload Update to SMD. | Architect, trade |
| SOTA-FUNC-021 | Enable the end user to manually install the update. | Architect |
| SOTA-FUNC-022 | CPS verifies integrity and authenticity of update. | Architect |
| SOTA-FUNC-023 | CPS stores update. | Architect |
| SOTA-FUNC-024 | Notify CPS supplier of the update status. | Architect |
| SOTA-DATA-001 | The SOTA may provide a source of cryptographically strong pseudorandom bits. | Architect |
| SOTA-DATA-002 | The SOTA may provide the capability to process the CPS Software and CPS Data as needed to perform the over-the-air update | Architect, trade |
| SOTA-DATA-003 | The SOTA may provide the capability to digitally sign updates to process the integrity and authenticity of the data contained therein. | Architect |
| SOTA-DATA-004 | Update status notifications may contain information to identify the CPS, the update package ID, the success or failure of the installation, and if a failure the nature of the failure | Architect, trade |
| SOTA-SEC-001 | Information Flow Enforcement | Architect |
| SOTA-SEC-002 | Separation of Duties | Architect |
| SOTA-SEC003 | Least Privilege | Architect |
| SOTA-SEC-004 | Unsuccessful Login Attempts | Architect |
| SOTA-SEC-005 | System Use Notification | Architect |
| SOTA-SEC-006 | Session Lock | Architect |
| SOTA-SEC-007 | Wireless Access | Architect |
| SOTA-SEC-008 | Auditable Events | Architect |
| SOTA-SEC-009 | Content of Audit Records | Architect, trade |
| SOTA-SEC-010 | Audit Storage Capacity | Architect |
| SOTA-SEC-011 | Response To Audit Processing Failures | Architect |
| SOTA-SEC-012 | Audit Reduction and Report Generation | Architect |
| SOTA-SEC-013 | Time Stamps | Architect |
| SOTA-SEC-014 | Protection of Audit Information | Architect |
| SOTA-SEC-015 | Audit Generation | Architect |
| SOTA-SEC-016 | Identification and Authentication (organizational users) | Architect |
| SOTA-SEC-017 | Device Identification and Authentication | Architect, trade |
| SOTA-SEC-018 | Authenticator Feedback | Architect |
| SOTA-SEC-019 | Cryptographic Module Authentication | Architect |
| SOTA-SEC-020 | Identification and Authentication (Non-organizational users) | Architect |
| SOTA-SEC-021 | Application Partitioning | Architect |

TABLE 1-continued

Traceability matrix

| Identifier | Description | How met type |
| --- | --- | --- |
| SOTA-SEC-022 | Information In Shared Resources | Architect |
| SOTA-SEC-023 | Denial of Service Protection | Architect |
| SOTA-SEC-024 | Boundary Protection | Architect |
| SOTA-SEC-025 | Transmission Integrity | Architect, trade |
| SOTA-SEC-026 | Transmission Confidentiality | Architect, trade |
| SOTA-SEC-027 | Network Disconnect | Architect |
| SOTA-SEC-028 | Cryptographic Key Establishment and Management | Architect |
| SOTA-SEC-029 | Use of Cryptography | Architect |
| SOTA-SEC-030 | Public Access Protections | Architect |
| SOTA-SEC-031 | Collaborative Computing Devices | Architect |
| SOTA-SEC-032 | Secure Name/Address Resolution Service (Authoritative Source) | Architect |
| SOTA-SEC-033 | Architecture and Provisioning for Name/Address Resolution Service | Architect |
| SOTA-SEC-034 | Session Authenticity | Architect |
| SOTA-SEC-035 | Protection of Information At Rest | Architect |
| SOTA-SEC-036 | Information System Partitioning | Architect |

As an overview of the System Requirements Specification (SRS), the SOTA update system is a distributed computation system present in multiple locations, including the CPS supplier, the CPS device platform, and a process resident on the CPS device itself. The SOTA provides the capability to securely and quickly update the software/firmware running on the CPS devices in a manner that minimizes the amount of time required by an end user while maintaining the security of the update process. It is one part of a Security Provider's overall cyber security offering.

According to one or more embodiments, the SOTA may provide one or more of the following capabilities. The CPS supplier's SOTA server prepares the update in such a manner that only the targeted set of CPS devices at the customer's location will be able to install them and so that the integrity and authenticity of the update will be verifiable by both end users and the CPS devices. The CPS supplier's SOTA server sends the packaged updates to the customer's SOTA server over a mutually-authenticated secure connection set up across an untrusted network (e.g., Internet). An end user on the CPS platform can use the customer's SOTA server to verify the integrity and authenticity of the update package. An authorized end user on the CPS platform can use the customer's SOTA server to push the update to the targeted set of CPS devices which will also verify the integrity and authenticity of the package before storing it in a designated section of protected non-volatile memory. If a batch update is being performed, the authorized end user on the CPS platform can use the customer's SOTA server to initiate the update attempt. The SOTA process running on the CPS device will report the status of the update attempt back to the SOTA systems at the customer and the CPS supplier's locations once the update attempt has completed.

As described above, one or more objectives of this specification of the SOTA may be to provide a system overview of the SOTA, including definition, goals, objectives, context, and major capabilities; and to specify one or more of the following associated features: business features; functional features; data features; hardware features; system security requirements; and/or system constraints.

The description below is organized includes several sections. System Overview provides a brief, high level description of the SOTA including its definition, business goals, business objectives, context, and capabilities. Functional features specifies the functional system features in terms of a use case model consisting of each external's use cases and use case paths. Data features specifies the system data features in terms of required data components. Hardware features specifies the system hardware features in terms of the hardware specifications for the deployed environment of the SOTA. Security requirements specifies the required system security robustness & quality considerations. System Constraints documents architecture, design, and implementation constraints on the SOTA.

This section provides a high-level description of the SOTA system including its definition, goal, objectives, context, and capabilities. The SOTA system is a system of Cybersecurity IP which supports secure (e.g., integrity, authenticity) distribution of software package, updates, and data to a number of potential locations, including a new CPS maintenance center.

One goal of the SOTA system is to enable over-the-air transmission of updates for the Security Provider's Cyber-Physical system (CPS) to a staging facility and eventual distribution to the CPS devices while maintaining the confidentiality, integrity, and source authenticity of these updates without invalidating its certification. An objective of the SOTA is to provide one or more of the following benefits to users.

According to one or more embodiments, the SOTA may: (1) provide its users with a solution to ease the burden of software/firmware updates and maintenance. With SOTA, it may no longer be necessary to send a person to every CPS to perform maintenance/administration; this action may be performed from a remote location such as the maintenance room; thus, the time required to update a large group of CPS devices may be reduced by two orders of magnitude; (2) enhance the security of the software update process, providing confidentiality, integrity, authentication, and non-repudiation for the updates themselves, as well as requiring an authorized human to install the updates on the CPS; and/or (3) reduce CPS downtime through a combination of distributed updates and enhance CPS to support hot-swapping, if possible.

The SOTA provides secure to moderate impact level of NIST RMF using NIST SP 800-53 security controls. The SOTA may give Security Provider the capabilities to securely update Security Provider's CPS software with less time and less personnel than currently required without invalidating its certification or bring in malicious software and data into the CPS. With SOTA, it is no longer necessary to send a person to every CPS to perform maintenance/administration. This action can be performed from a remote location such as the maintenance room. The time required to update a large group of CPS devices may be reduced by orders of magnitude.

As an example, one example of a deployment environment may be targeted for a military application. Features that are a part of the Secure Software Supply Chain & Stewardship category may be applicable to the SOTA, and the SOTA will offer full compliance with the features to provide assurance as to the integrity and authenticity of the updates.

TABLE 2

Example Product Features
Features

Cyber security.
If a controller is used, the controller may meet the cyber security standards.
The CPS supplier may provide their methodology for meeting the requirements to the purchaser for approval.
If the cyber security requirements cannot be met, the CPS supplier may provide justification to the purchaser for approval detailing which specific requirements could not be met and why the requirement could not be met.
Connectors. The exterior enclosure of the CPS assembly may contain receptacle connectors.
The controller configuration interface may be used by the CPS supplier and end user for loading software revisions, firmware revisions, diagnostics, production testing (as applicable), and parameter configuration.
The network ports and controller configuration interface must be secured when not in use (e.g. physical lock).
All Software and firmware revisions may have capability to be updated from the controller configuration interface and not require CPS removal.
The network ports and controller configuration interface may have a purchaser approved means to accomplish software configuration management and cyber security.
All receptacles may require strain relief and may be covered when not in use and may comply with the enclosure requirements.
To facilitate connection and disconnection of connectors, clearance may be maintained between the connector and any obstruction, so that the connectors can be grasped firmly by the hand and allow for rotation of the hand.
The CPS design may also utilize connectors as approved by the Purchaser to ease disassembly of the controller, motor or other sub components from the CPS assembly for repair/maintenance."
Configuration interface.
The controller may have one controller configuration interfaces for each CPS type.
The controller configuration interface may be a standard industry connection, such as Ethernet, RS 485, or RS 232.
The controller configuration interface may be used by the CPS supplier for loading software revisions, diagnostics, production testing (as applicable), and parameter configuration.
Any ports on the controller may be physically secured when not in use.
The port may be disabled when not in use and comply with the cyber security requirements of the CPS specification.
The connection may comply with the enclosure requirements.
The configuration interface may be approved by the Purchaser.
Data element description.
Characteristics of individual data elements that the interfacing entities will provide, store, send, access, receive, etc., such as:
Name of Data Element
Data type (alphanumeric, integer, etc.)
Size and format (such as length and punctuation of a character string)
Units of measurement (such as meters, nanoseconds)
Range or enumeration of possible values (such as 0-99)
Accuracy (how correct) and precision (number of significant digits)
Priority, timing, frequency, volume, sequencing, and other constraints, such as whether the data element may be updated and whether special rules apply
Security and privacy (personnel records) constraints
Sources (setting/sending entities) and recipients (using/receiving entities)"
Data assembly description. (Provide as applicable)
Characteristics of data element assemblies (records, messages, files, arrays, displays, reports, etc.) that the interfacing entities will provide, store, send, access, receive, etc., such as:
Name of data assembly
Data elements in the assembly and their structure (number, order, grouping)
Medium (such as disk or memory) and structure of data elements/assemblies on the medium
Access characteristics (Read, Write)
Priority, timing, frequency, volume, sequencing, and other constraints, such as whether the assembly may be updated and whether special rules apply
Security and privacy constraints
Sources (setting/sending entities) and recipients (using/receiving entities)"
Provide port blockers for all physical ports that are accessible on the exterior of the CPS and not normally populated. Also provided may be the special purpose tool used to remove the port blockers.

TABLE 2-continued

Example Product Features
Features

All data port accessible on the exterior of the CPS enclosure may have a dedicated purpose.
All physical ports of the CPS may be disabled when not in use.
All ports may be disabled by default, with the exception of port(s) used for initial configuration.
The CPS may only permit configuration of parameters via the configuration port(s).
All passwords, to include those associated with factory accounts, may be changeable.
The CPS may continuously maintain state information (e.g. previous 'n' processes, initial failure exception, stack, etc.) necessary to determine the cause of a failure.
The CPS configuration software will provide a method to verify integrity and authenticity of installation media prior to installation on CPS.
The CPS may employ internal integrity verification tools to detect unauthorized modification to programming or data.
The CPS may ensure that programming and data is write protected at all times except when write protection is locally disabled by the operator to perform authorized modifications.
Disabling the write protection on CPS programming and data may only occur on the specific memory devices that need to be modified.
The CPS may store all programming and data on a permanently attached memory device.
The CPS may perform configurable pre-defined actions if anomalies are detected or communications are interrupted.
The CPS software and/or firmware may perform bounds checking on all configurable parameters to ensure they are within acceptable ranges.
The CPS may perform pre-defined actions if anomalies are noted during integrity data verification (e.g. malware discovered, corrupted data).
Only hardware and programming necessary for operation, maintenance, and security of the CPS may be included in the system.
CPS software/firmware may not contain hidden accounts or passwords.
CPS ports may not utilize any form of auto execution of software and/or firmware.
The CPS may have the capability to perform a memory dump of all programming and data.
Software/firmware may fail to a known secure state.
Software/firmware may recover securely from failures.
The CPS may utilize secure versions of ports, protocols, and services.
Software/firmware may securely recover from buffer overflows in order to prevent escalation of privileges that may result in the execution of unauthorized code.
The vendor may provide source code which will be escrowed to the plant.
The vendor may provide for secure delivery from the vendor to the plant.
The CPS may communicate only with other systems necessary to support the required functions of the interconnected systems.
Only those parameters necessary to support the required functions of the interconnected systems may be passed from the CPS to external systems.
Only those parameters necessary to support the required functions of the interconnected systems may be received and processed by the CPS from external systems.
Interfaces to external systems may be explicitly defined such that only pre-defined data can be received from or transmitted to the external system.
Modification of CPS programming and data may only occur using a local device.

This subsection documents the context of the SOTA in terms of the significant externals with which it interacts. As illustrated in FIG. 1, the SOTA interfaces with several external actors and systems, which are elaborated in one or more of the following subsections.

The SOTA may interact, either directly or indirectly, with external hardware. Additionally, the SOTA interacts, either directly or indirectly, with one or more of the following roles and/or entities.

The SOTA interacts with end users 130, which are the authorized actors, that will interact with the SOTA to: verify the successful receipt of any updates that have been pushed to the system as well as their successful integrity and authentication verification; load update packages onto SMD for individual CPS updates; manually initiate the update process and report failed updates to the CPS supplier so that the update process can begin anew; and/or receive notification of the status of updates after installation attempts have completed.

The SOTA interacts with the CPS supplier, which is the entity that: Initiates the update process for one or more of the CPSs; pushes the update to the customer SOTA; and/or receives notification of the status of updates after installation attempts have completed.

The SOTA interacts with the SOTA administrator 121, which is the entity that: administers the CPS supplier server; installs, configures, and maintains the SOTA; and/or reviews system logs.

The SOTA interacts with the SOTA security administrator 122, which is the entity that: maintains the security infrastructure of the SOTA server; maintains the SOTA PKI including certificates and keying material needed for the SOTA; and/or reviews system and security logs.

According to one or more embodiments, the SOTA interacts, either directly or indirectly, with the SASH server, which is the software running on the SASH which the SOTA will initially connect to before being routed to and establishing a connection with the CPS.

According to one or more embodiments, the SOTA interacts, either directly or indirectly, with one or more of the following external systems. The SOTA interacts with the update build system, which is the secure system from which all updates stem. The updates will be built from audited code using approved compilers, linkers, etc. and the build results will be securely transferred to the supplier SOTA in a manner that preserves confidentiality, integrity, and authenticity. The SOTA interacts with the Cyber-Physical Systems (CPS). The CPS may be a system that comprises of interacting digital, analog, physical, and human components engineered for function through integrated physics and logic. The SOTA interacts with the SASH, which is the entity that provides and manages a secure networking environment for the CPS and related devices as well as providing routing to authenticated devices from outside this secure network to devices inside this secure network. The SOTA interacts with the SMD. The SMD will be used by authorized users to initiate the update process once an update has been successfully received and validated by either the CPS or the SMD if the option to push updates to the SMD is used. The SOTA interacts with the Internet, which will be used as the medium over which to connect to the SASH in order to set up a secure connection and then connect to CPS devices inside the SASN network.

The below section describes an overview of capabilities of the SOTA. According to one or more embodiments, the SOTA will provide one or more of the following capabilities to users and/or entities. For end users, the SOTA will verify the integrity and authenticity of any updates that have been pushed to the system, and/or manually initiate the update process on the CPS. For CPS supplier, the SOTA will notify infrastructure of upcoming update pushes, push updates to specified remote CPSs over a secure, authenticated communication channel, and/or receive notification of a successful update. For SOTA administrators, the SOTA will install, configure, and maintain the SOTA, and/or manage system logs. For SOTA security administrators, the SOTA will manage security logs, configure and maintain security parameters, configure and manage PKI, including certificates and keying material, and/or establish access privileges for SOTA.

According to one or more embodiments, the customer SOTA will interact with the SASH to establish a secure network connection and to obtain a route to the CPS. The customer SOTA will interact with the CPS to establish a secure tunnel to push the update over. The SOTA will provide the capability for the CPS to verify the integrity and authenticity of updates.

According to one or more embodiments, the SOTA will implement NIST SP 800-53 at moderate impact level.

The below description of the SRS specifies the functional features of the SOTA in terms of use cases and their associated use case paths. The use case model is primarily organized in terms of the externals that benefit from the use cases.

Figure 14:
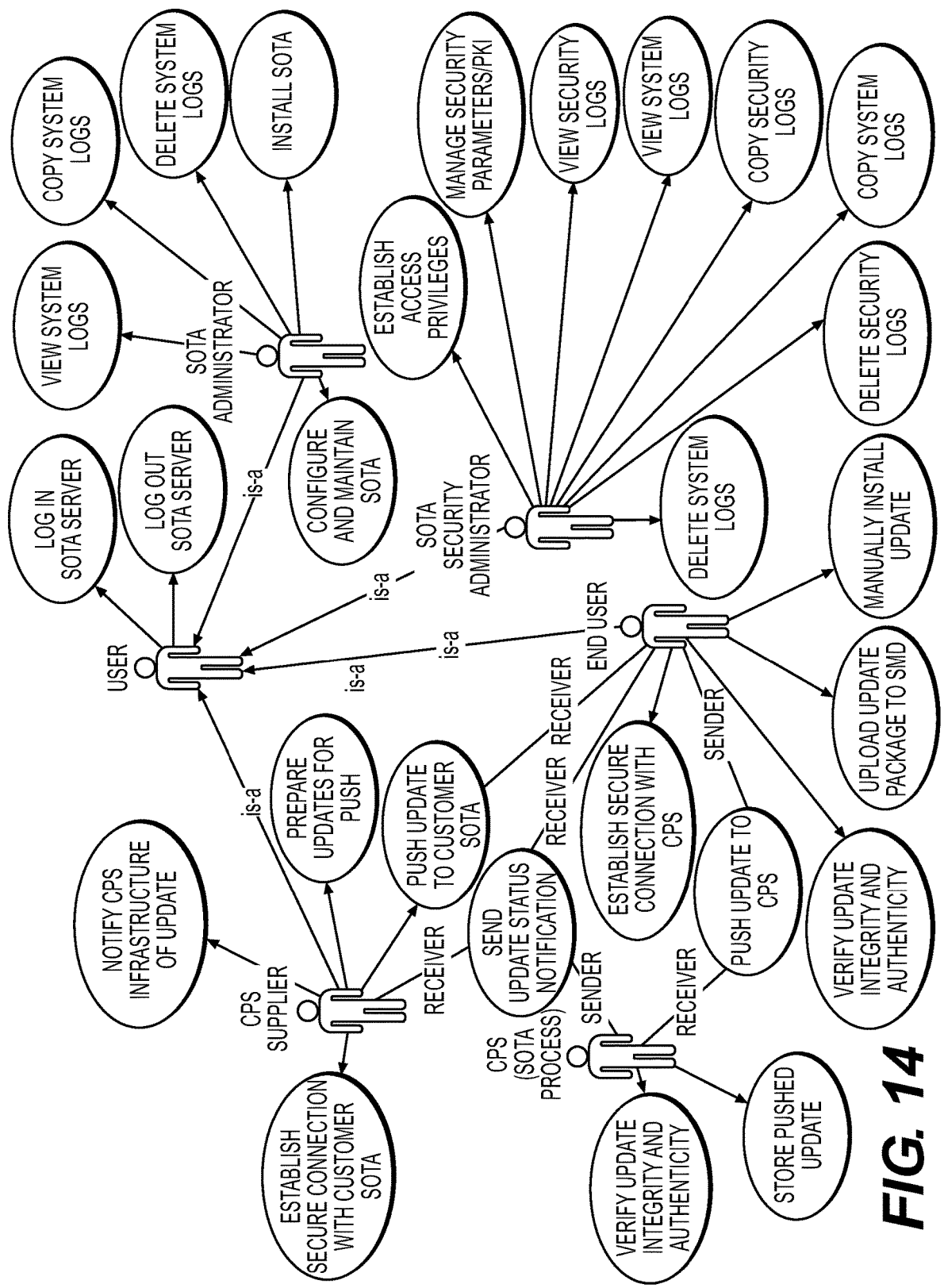
FIG. 14 depicts an example Summary Use Case Diagram, according to one or more embodiments.

FIG. 14 depicts a use case diagram that summarizes the functional features for the SOTA, according to one or more embodiments. This subsection describes and specifies external roles, the associated responsibilities, and use cases primarily driven by these externals. The subsection specifies the functional features associated with the SOTA.

According to one or more embodiments, the CPS supplier is the role played by a user that takes the update provided by the build system, packages it for consumption by the CPSs, and initiates the update process for one or more of the CPSs.

According to one or more embodiments, the CPS supplier has one or more of the following responsibilities: to notify the infrastructure of upcoming update push; to prepare the software update packages that are to be pushed to the individual CPSs; to initiate the update process; to establish a secure connection to the SASH; and/or to establish a secure connection to the appropriate CPS via the SASH and pushing the update package to the CPS.

According to one or more embodiments, the CPS supplier may need one or more of the following technical expertise, experience, and training to effectively interact with the SOTA: knowledge of supplier's update server, and/or knowledge of CPS that is to receive update.

Figure 15:
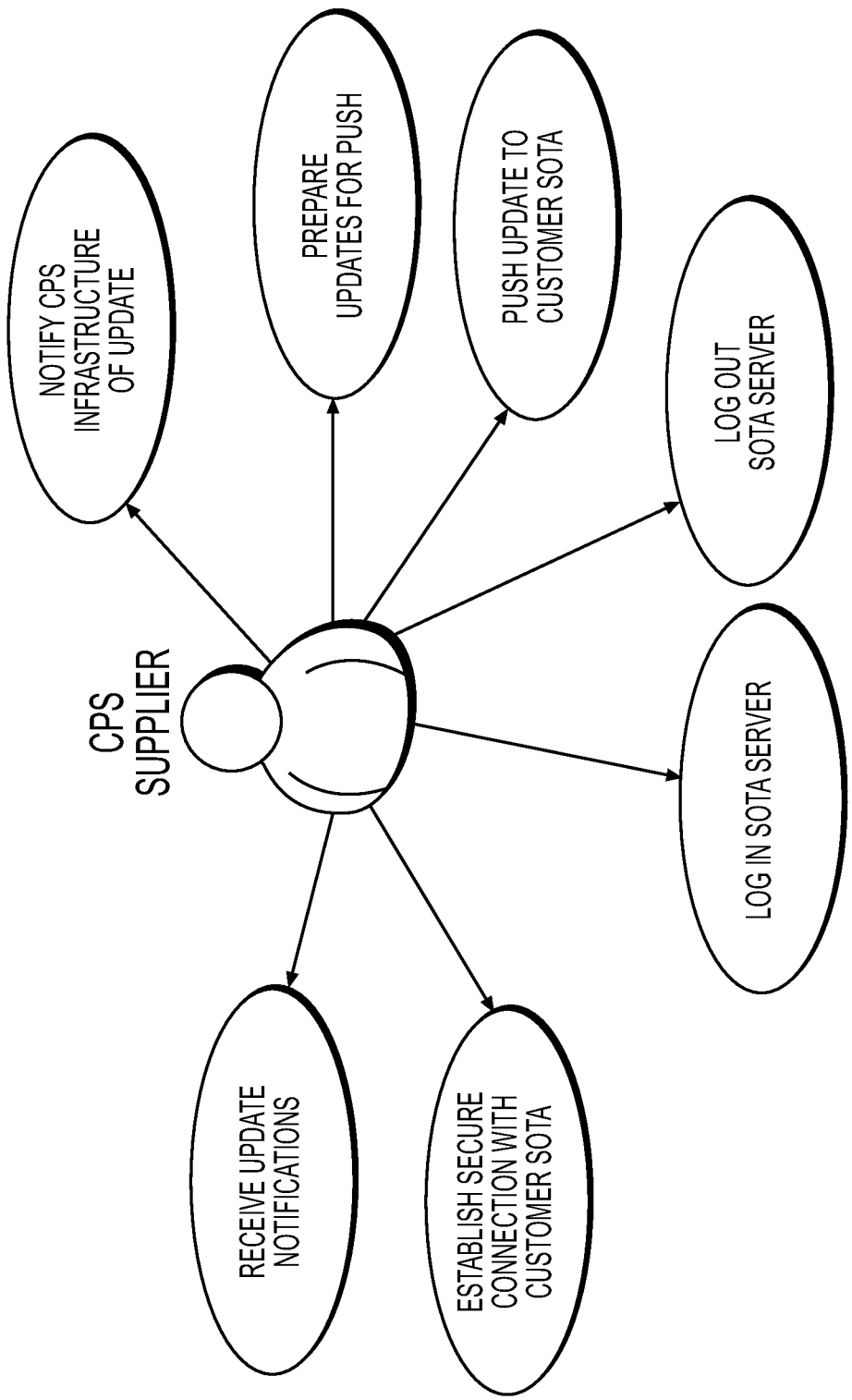
FIG. 15 depicts an example CPS supplier Use Case Diagram, according to one or more embodiments.

FIG. 15 depicts an example CPS supplier Use Case Diagram, according to one or more embodiments. The use cases may include: CPS supplier logs in to server; CPS supplier logs out of server; CPS supplier notifies infrastructure of pending update; CPS supplier prepares update for push to CPS device; CPS supplier establishes secure connection with customer SOTA; and/or CPS supplier receives notification of final update status.

According to one or more embodiments, a use case for CPS supplier logs in to SOTA Server may include feature number: SOTA-FUNC-001. The SOTA may provide the capability for an authorized CPS supplier to log in to the SOTA. Access to capabilities will depend on the user role. There are four roles for SOTA: CPS supplier, SOTA administrator, and/or SOTA security administrator.

According to one or more embodiments, a use case for CPS supplier logs out of SOTA Server may include feature number: SOTA-FUNC-002. The SOTA may provide the capability for a CPS supplier to log out of the SOTA. Access to any capabilities beyond log in is removed until the user logs in again.

According to one or more embodiments, a use case for CPS supplier prepares update for push to CPS device may include feature number: SOTA-FUNC-003. The SOTA provides the capability for an authorized and authenticated CPS supplier to prepare updates for push to the customer-side SOTA. Update preparation will include the encryption and signing of the update package using keying material appropriate for the final destination of the update. This will enable the customer to verify the authenticity of the update. It will also allow only the end CPS devices that are targeted by the update to decrypt the update, enabling the installation of the update only on the desired end devices. Additionally, installation may be done in one or more ways: e.g., a bulk installation that can be triggered by an authorized, authenticated end user on multiple CPS devices at once from the customer SOTA, or individual updates for more sensitive CPS devices that will be manually triggered by an authorized, authenticated end user with a direct connection to the CPS via SMD. If any of the preparation steps fail, the error may be recorded in the system logs and if the failure originated in any cryptographic routines, that error may be recorded in the security logs.

According to one or more embodiments, a use case for CPS supplier notifies customer SOTA of upcoming push may include feature number: SOTA-FUNC-004. The SOTA may provide the capability for an authorized and authenticated CPS supplier to notify the customer SOTA of an upcoming update. The notification will include information including the time of the upcoming update, the destination of the update, and the contents of the update. The CPS supplier may retry this notification transmission a specified number of times if an acknowledgement of the notification is not received. After the final unsuccessful transmission attempt, an error may be recorded in the system logs.

According to one or more embodiments, a use case for CPS supplier establishes a secure connection the customer SOTA across an untrusted TCP/IP network may include feature number: SOTA-FUNC-005. An authorized and authenticated CPS supplier may be able to establish a secure connection with the customer SOTA. The connection begins by first making a standard TCP connection with the customer SOTA via the Internet. Following this connection, the two ends of the SOTA may complete a security handshake where the SOTA may first authenticate the identity of the customer SOTA via method such as public key cryptography, then proves its identity to a customer SOTA via a similar method. Then, once the SOTA devices are mutually authenticated, they negotiate a cipher suite to be used to protect traffic passed between the two entities. The resulting cipher suite may be used to protect all traffic between the Security Provider SOTA and the customer SOTA. If the initial TCP connection fails, an error is returned to the CPS supplier and recorded in the system logs. If any of the steps of the secure handshake fail, the connection is terminated an error is returned to the CPS supplier and recorded in the security logs of both the Security Provider and customer SOTA.

According to one or more embodiments, a use case for CPS supplier receives notification of update status may include feature number: SOTA-FUNC-006. The SOTA may enable the CPS supplier to receive notification of update. To enable this, the SOTA may provide a network service that listens on a known port for connections providing confirmation of successful update. The confirmations will be sent by the CPS following the completion of an update installation attempt. Confirmations may contain information identifying the specific update and CPS device as well as date and time of successful update. Upon receipt of the notification, SOTA may log the notification for the SOTA administrator to access.

The below description specifies functional features associated with SOTA administrator. The SOTA administrator may be a user that administers the SOTA server. The SOTA administrator may have one or more of the following responsibilities: to install, configure and maintain the SOTA server and the SOTA implementation running on it; and/or to review and administer system logs. The SOTA administrator may need knowledge of SOTA server to effectively interact with the SOTA.

Figure 16:
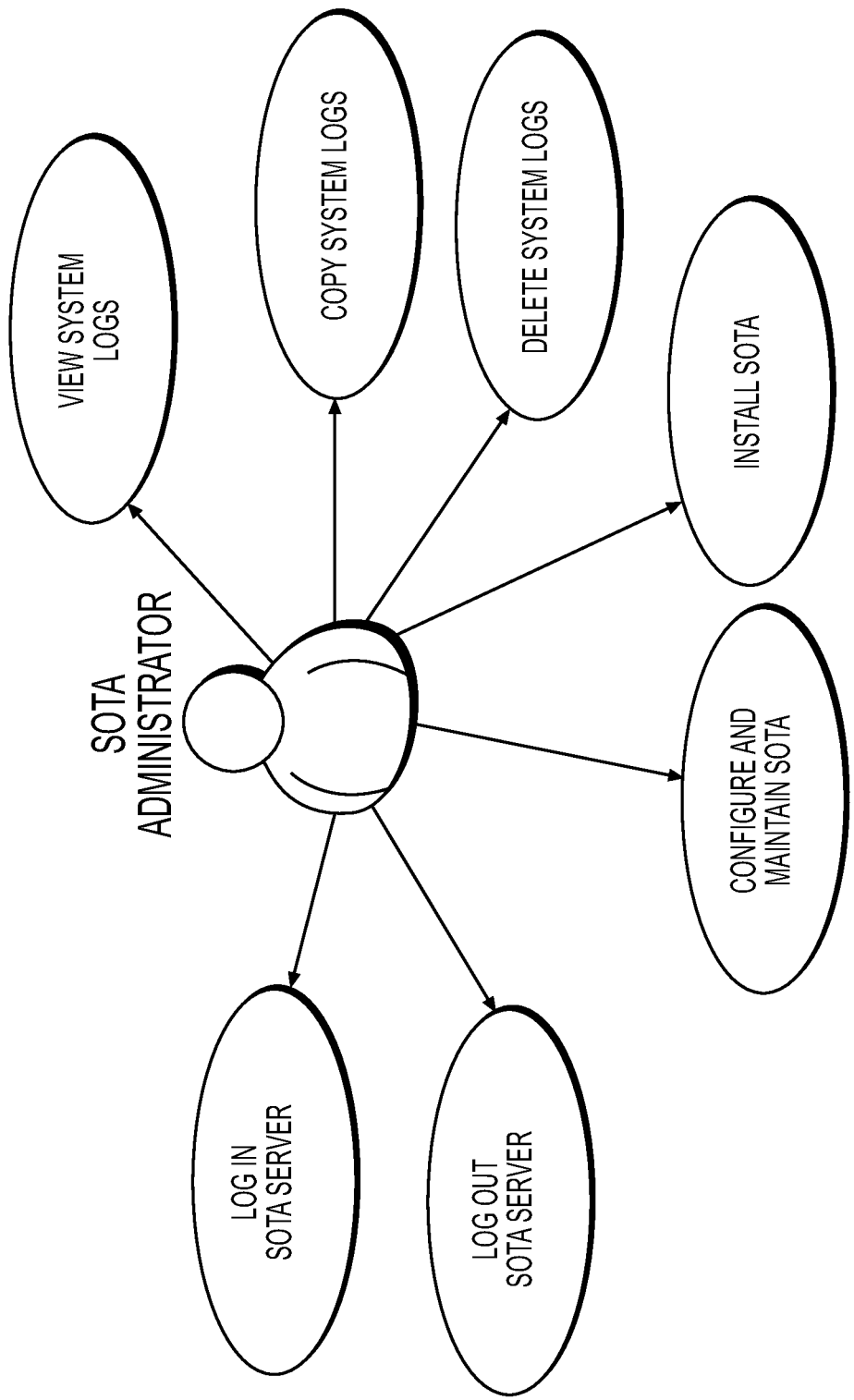
FIG. 16 depicts an example SOTA ttrator Use Case Diagram, according to one or more embodiments.

FIG. 16 depicts an example SOTA administrator Use Case Diagram, according to one or more embodiments. The use cases may include SOTA administrator logs in to server; SOTA administrator logs out of server; SOTA administrator views, copies, or deletes system logs; SOTA administrator installs the SOTA system; and/or SOTA administrator configures and maintains server. A use case for SOTA administrator logs in to SOTA Server may include feature number: SOTA-FUNC-001. The SOTA provides the capability for an authorized SOTA administrator to log in to the SOTA. A use case for CPS supplier logs out of SOTA Server may include feature number: SOTA-FUNC-002. The SOTA may provide the capability for a SOTA administrator to log out of the SOTA. Access to any capabilities beyond log in is removed until the administrator logs in again. A use case for SOTA administrator installs SOTA system may include feature number: SOTA-FUNC-007. An authorized SOTA administrator may install the SOTA system on the CPS supplier's servers. Provided a computing system that meets the minimum requirements to host the SOTA, the SOTA administrator will be authorized to load the SOTA installation software on the system and carry out the installation. A use case for SOTA administrator configures and maintains SOTA system may include feature number: SOTA-FUNC-008. The SOTA may provide authenticated SOTA administrators access to the configuration and maintenance functionality of the system. To enable this, an authenticated SOTA administrator will be able to modify various attributes and settings of the SOTA system.

A use case for SOTA administrator views system logs may include feature number: SOTA-FUNC-009. The SOTA may provide read access to the system logs to all authenticated users in the SOTA administrator role and execute access to any special log viewing applications. A use case for SOTA administrator copies system logs may include feature number: SOTA-FUNC-010. The SOTA provides read access to all users in the SOTA administrator role and write access to other storage locations, for the purposes of, e.g. archives or log analysis. A use case for SOTA administrator deletes system logs may include feature number: SOTA-FUNC-011. The SOTA provides write access to all authenticated users in the SOTA administrator role, allowing for the modification or deletion of system logs.

The below description specifies functional features associated with the SOTA security administrator. The SOTA security administrator may be the entity that maintains the security infrastructure of the SOTA server, including all certificates and keying material needed for the SOTA. The SOTA Security administrator may have one or more of the following responsibilities: to manage the system security logs; to configure and maintain the system's security parameters including the PKI and the certificates and keying material associated with it; and/or establish access privileges for other users of the SOTA. The SOTA security administrator may need one or more of the following technical expertise, experience, and training to effectively interact with the SOTA: knowledge of SOTA server, understanding of computer security, and/or understanding of public key infrastructure.

Figure 17:
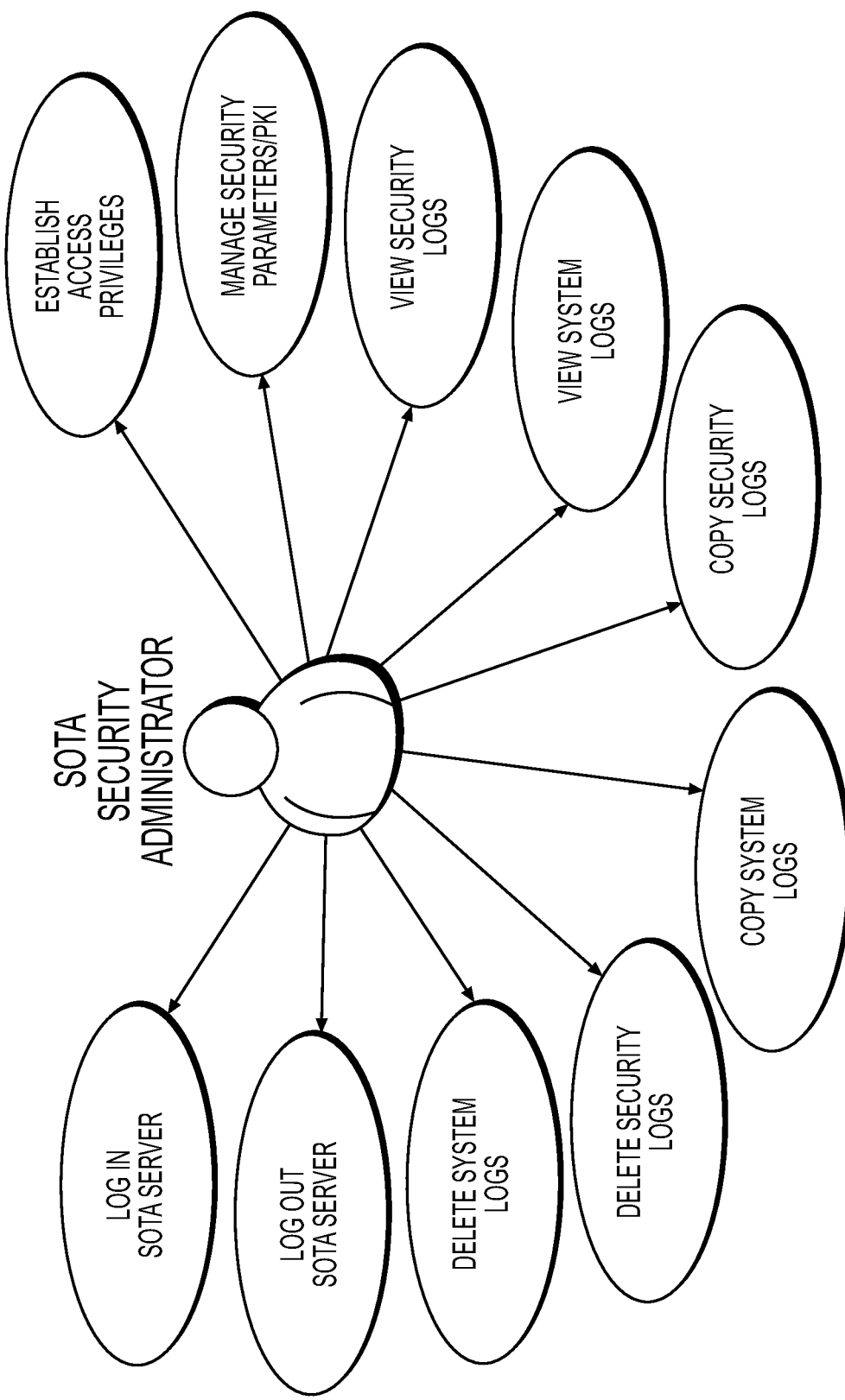
FIG. 17 depicts an example SOTA security administrator Use Case Diagram, according to one or more embodiments.

FIG. 17 depicts an example SOTA security administrator Use Case Diagram, according to one or more embodiments. The use cases may include SOTA security administrator logs in to server; SOTA security administrator logs out of server; SOTA security administrator views, copies, or deletes system logs; SOTA security administrator views, copies, or deletes system security logs; SOTA security administrator establishes access privileges for different system roles; and/or SOTA security administrator configures and maintains system security parameters and PKI. A use case for SOTA security administrator logs in to SOTA Server may include feature number: SOTA-FUNC-001. The SOTA may provide the capability for an authorized SOTA security administrator to log in to the SOTA-Access to capabilities will depend on the user role. A use case for SOTA security administrator logs out of SOTA Server may include feature number: SOTA-FUNC-002. The SOTA may provide the capability for a SOTA security administrator to log out of the SOTA-Access to any capabilities beyond log in is removed until the security administrator logs in again. A use case for SOTA Security administrator establishes access privileges for the SOTA system may include feature number: SOTA-FUNC-012. The SOTA Security administrator may be able to assign access privileges throughout the system to all users and roles of the SOTA-All users on the system may be associated with a specified role and granted access to only those features and files of the system that are necessary to carry out the duties of their role. The SOTA security administrator may be the role that establishes the permissions for each of the users of the system. A use case for SOTA Security administrator configures and maintains SOTA security parameters and PKI may include feature number: SOTA-FUNC-013. The SOTA may provide authenticated SOTA security administrators access to the configuration and maintenance functionality pertaining to the security parameters and PKI for the system. A use case for SOTA Security administrator views system logs may include feature number: SOTA-FUNC-009. The SOTA may provide read access to the system logs to all authenticated users in the SOTA security administrator role and execute access to any special log viewing applications. A use case for SOTA Security administrator copies system logs may include feature number: SOTA-FUNC-010. The SOTA may provide read access to all authenticated users in the SOTA security administrator role and write access to other storage locations, for the purposes of, e.g. archives or log analysis. A use case for SOTA Security administrator deletes system logs may include feature number: SOTA-FUNC-011. The SOTA may provide write access to all authenticated users in the SOTA security administrator role, allowing for the modification or deletion of system logs. A use case for SOTA Security administrator views system security logs may include feature number: SOTA-FUNC-014. The SOTA may provide read access to the system security logs to all authenticated users in the SOTA security administrator role and execute access to any special log viewing applications. A use case for SOTA Security administrator copies system security logs may include feature number: SOTA-FUNC-015. The SOTA may provide read access to the system security logs for all authenticated users in the SOTA security administrator role and write access to other storage locations, for the purposes of, e.g. archives or log analysis. A use case for SOTA Security administrator deletes system security logs may include feature number: SOTA-FUNC-016. The SOTA may provide write access to the system security logs for all users in the SOTA security administrator role, allowing for the modification or deletion of system security logs.

The below description specifies the functional features associated with end users. The user is the role played by a human authorized to install the delivered updates onto the CPS. The end user may have one or more of the following responsibilities: to verify that the update that was pushed to the CPS was successfully verified with regards to integrity and authenticity; to initiate the update installation by connecting to the CPS via the SMD, authenticating themselves to the CPS as an authorized role for the update installation and manually kicking off the update procedure.

The end user may need one or more of the following technical expertise, experience, and training to effectively interact with the SOTA: training in how to use the SOTA to log into the system and initiate updates; and/or training in how to verify integrity and authentication check results.

Figure 18:
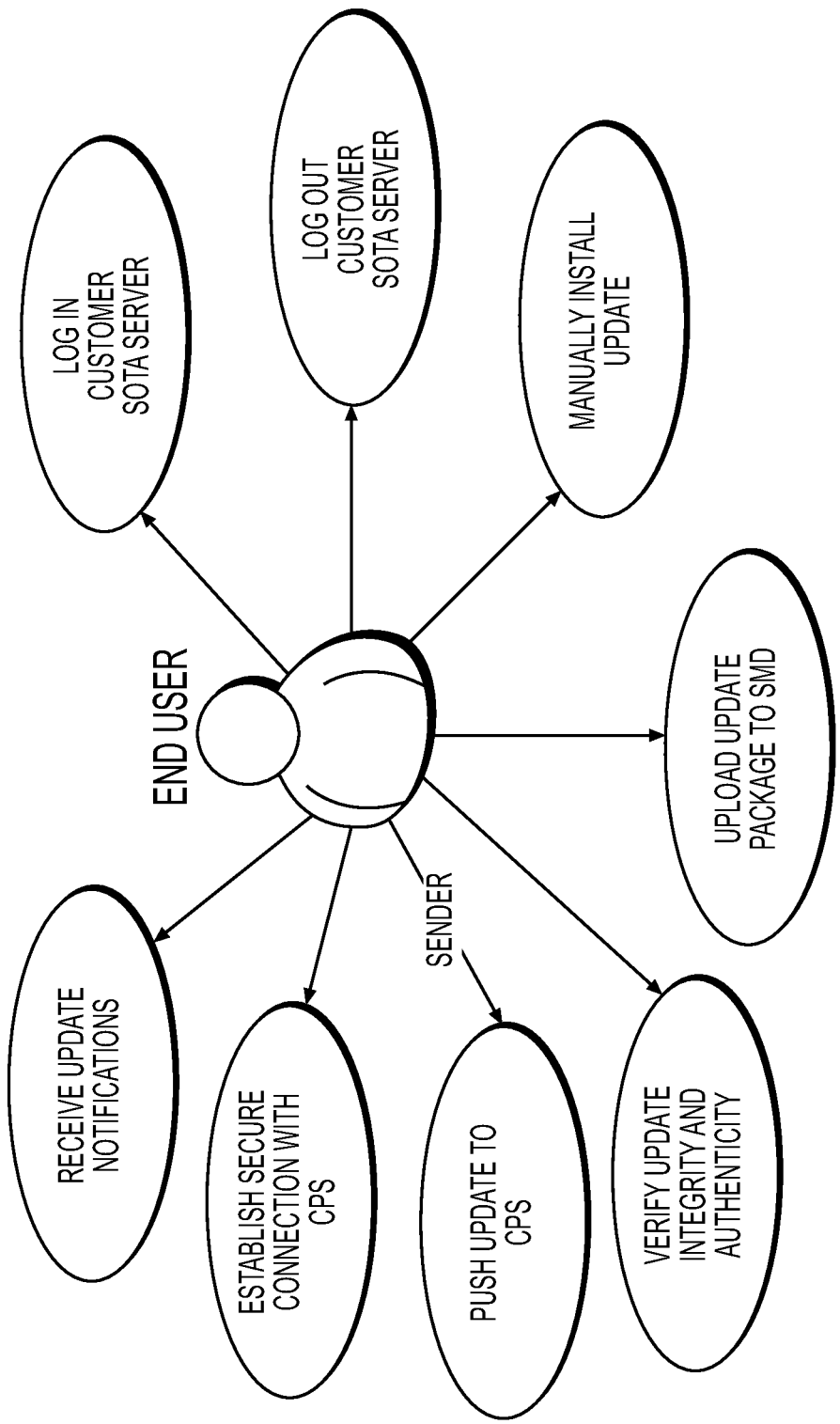
FIG. 18 depicts an example end user Use Case Diagram, according to one or more embodiments.

FIG. 18 depicts an example end user Use Case Diagram, according to one or more embodiments. The use cases may include: end user log in to customer SOTA Server; end user log out of customer SOTA Server; end user establishes secure connection with CPS via SASH; end user verifies integrity and authentication checks on update; end user uploads update packages to the SMD for manual transfer; end user pushes updates to the CPS devices for batch updates; end user manually initiates update installation on CPS; end user receives update status notifications from the CPS devices.

According to one or more embodiments, a use case for end user logs in to SOTA Server may include feature number: SOTA-FUNC-001. The SOTA may provide the capability for an authorized End user to log in to the SOTA. Access to capabilities will depend on the user role. Authentication on the customer SOTA may make use of the customer's authentication infrastructure where available.

According to one or more embodiments, a use case for end user logs out of SOTA Server may include feature number: SOTA-FUNC-002. The SOTA may provide the capability for an end user to log out of the SOTA. Access to any capabilities beyond log in is removed until the end user logs in again.

According to one or more embodiments, a use case for end user verifies integrity and authentication checks on update may include feature number: SOTA-FUNC-017. The SOTA may enable an authorized and authenticated end user to visually verify integrity and update. In order to enable this the customer's SOTA system, upon receipt of an update package, will be able to generate a visual representation of the update's transmitted signature information and the signature verification which is computed on the customer SOTA. The end user can visually compare the two and confirm that they match.

According to one or more embodiments, a use case for end user establishes a secure connection may include feature number: SOTA-FUNC-018.

An authorized and authenticated end user may be able to establish a secure connection with the CPS via the SASH. The SOTA will do this by authenticating the identity of a CPS via public/private key cryptography and then proving its identity to a CPS via public/private key cryptography. Once the two systems are mutually authenticated, they will negotiate a cipher suite to be used to protect traffic passed between the two entities. From that point on, all traffic between the SOTA and the CPS will be protected using the negotiated cipher suite.

According to one or more embodiments, a use case for end user pushes update to CPS may include feature number: SOTA-FUNC-019. After a secure connection is established with the CPS, an authorized and authenticated end user may push the update to the CPS for storage until installation. The package will be sent to the receiving process running on the CPS. Upon receipt of the package, the CPS will verify the integrity and authenticity of the package, and then stores the update package in a reserved section of protected non-volatile storage until the user kicks off the installation.

According to one or more embodiments, a use case for end user uploads update to SMD may include feature number: SOTA-FUNC-020. To enable the installation of the update to certain CPS devices that require a direct connection, an authorized and authenticated end user may upload the update to an SMD which may then be manually connected to the CPS for transmission/storage until installation.

According to one or more embodiments, a use case for end user manually initiates update may include feature number: SOTA-FUNC-021. Once the update has been stored on the CPS, the SOTA may enable an authorized and authenticated end user to manually install the update. This can be performed in one of two ways, either kicking off an installation on a set of CPSs at once, via the SASH or, for CPSs that are more sensitive via a direct connection using the SMD.

According to one or more embodiments, a use case for end user receives notification of update status may include feature number: SOTA-FUNC-006. The SOTA may enable the end user to receive notification of update.

The below description specifies the functional features associated with The SOTA process on the CPS. The CPS is the role played by the SOTA process running on the CPS. The CPS has one or more of the following responsibilities: to verify that the update that was pushed to the CPS was successfully verified with regards to integrity and authenticity; to store the pushed update to a specified location on the CPS; and/or to notify the CPS supplier of the status of updates following installation attempts.

Figure 19:
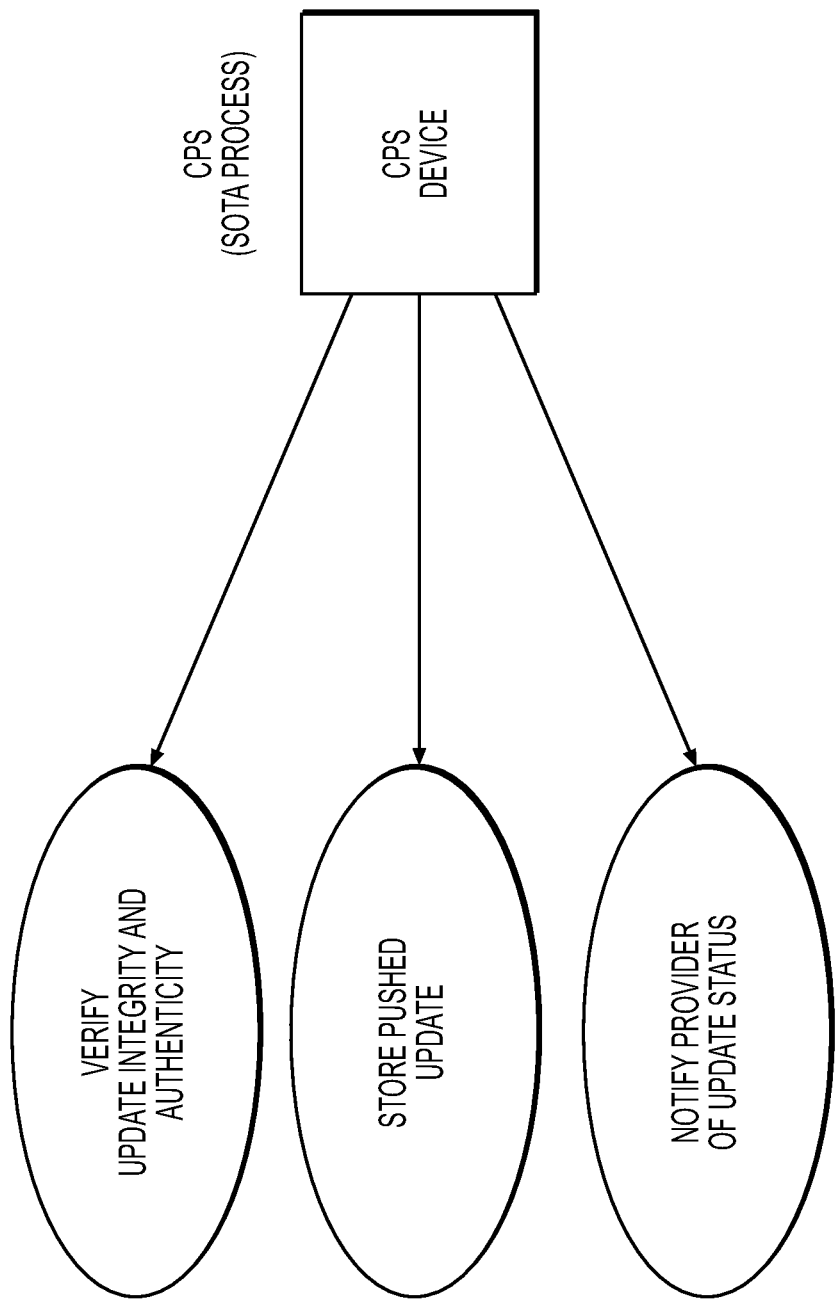
FIG. 19 depicts an example CPS Device Use Case Diagram, according to one or more embodiments.

FIG. 19 depicts an example CPS Device Use Case Diagram, according to one or more embodiments. The use cases may include: CPS verifies integrity and authentication checks on update; CPS stores update; and/or CPS notifies CPS supplier and end user of update status.

According to one or more embodiments, a use case for CPS verifies integrity and authentication checks on update may include feature number: SOTA-FUNC-022. The SOTA may enable the CPS to verify update integrity and authenticity. If the integrity or authenticity check fail, the CPS will notify the SOTA of the failure, and the SOTA will record the failure.

According to one or more embodiments, a use case for CPS Stores Update may include feature number: SOTA-FUNC-023. Upon successful verification of integrity and authenticity of update, the CPS may store the update in a designated storage location in protected non-volatile memory on the CPS.

According to one or more embodiments, a use case for CPS notifies CPS supplier and end user of update installation status may include feature number: SOTA-FUNC-024. Upon completion of update installation attempt, the CPS may notify the CPS supplier and end user of the status of the update. The notification will contain information to identify the CPS, the update package ID, the success or failure of the installation, and if a failure the nature of the failure.

TABLE 3

Functional Features Summary

| Identifier | Description |
|---|---|
| SOTA-FUNC-001 | Log in to SOTA. |
| SOTA-FUNC-002 | Log out of SOTA. |
| SOTA-FUNC-003 | Prepare update for push. |
| SOTA-FUNC-004 | Notify infrastructure of upcoming update. |
| SOTA-FUNC-005 | Establish secure connection with customer SOTA. |
| SOTA-FUNC-006 | Receive confirmation of update status. |
| SOTA-FUNC-007 | Install SOTA. |
| SOTA-FUNC-008 | Maintain the SOTA System. |
| SOTA-FUNC-009 | View system logs. |
| SOTA-FUNC-010 | Copy system logs. |
| SOTA-FUNC-011 | Delete system logs. |
| SOTA-FUNC-012 | Establish access privileges. |
| SOTA-FUNC-013 | Maintain the SOTA security parameters/PKI. |
| SOTA-FUNC-014 | View system security logs. |
| SOTA-FUNC-015 | Copy system security logs. |
| SOTA-FUNC-016 | Delete system security logs. |
| SOTA-FUNC-017 | Enable the end user to visually verify integrity and update. |
| SOTA-FUNC-018 | Establish secure connection with CPS. |
| SOTA-FUNC-019 | Push Update to CPS. |
| SOTA-FUNC-020 | Upload Update to SMD. |
| SOTA-FUNC-021 | Enable the end user to manually install the update. |
| SOTA-FUNC-022 | CPS verifies integrity and authenticity of update. |
| SOTA-FUNC-023 | CPS stores update. |
| SOTA-FUNC-024 | Notify CPS supplier of the update status. |

Data features on the SOTA system are described below. CPS Install Package is a collection of executable, binary and plain text files that make up the package for updating the CPS Device software. The collection may include: CPS Firmware (e.g., binary file); CPS Program (e.g., executable file); CPS Configuration (e.g., plain text file); CPS Data (e.g., plain text files); and/or CPS Update Readme (e.g., plain text file).

SOTA Software may be a collection of executable, binary and plain text files that make up the package for updating the SOTA. The collection may include: SOTA Program (e.g., executable files); SOTA Configuration (e.g., plain text files); and/or SOTA System Documentation (e.g., plain text files).

SOTA Data represents data that resides on the SOTA. The SOTA data may include: SOTA System Logs (e.g., plain text files); SOTA Security Log (e.g., encrypted file); SOTA Configurations (e.g., plain text files); and/or SOTA Security Configuration Files (e.g., encrypted files).

SOTA Security Data represents security data that resides on the SOTA. The SOTA Security Data may include: SOTA PKI Programs (e.g., executable files); SOTA PKI Private Keys (e.g., encrypted files); SOTA PKI Public Keys and certificates (e.g., plain text files); SOTA Security Configurations (e.g., encrypted files); and/or SOTA PKI Logs (e.g., encrypted files).

According to one or more embodiments, SOTA data features may include one or more of the following. The SOTA may provide a source of cryptographically strong random bits (e.g., SOTA-DATA-001). The SOTA may provide the capability to process the CPS Software and CPS Data as needed to perform the over-the-air update (e.g., SOTA-DATA-002). The SOTA may provide the capability to digitally sign updates to process the integrity and authenticity of the data contained therein (e.g., SOTA-DATA-003). Update status notifications may contain information to identify the CPS, the update package ID, the success or failure of the installation, and if a failure the nature of the failure (e.g., SOTA-DATA-004).

Hardware features for the SOTA are described below. The SOTA may be a distributed computing system that may have a presence in multiple locations, including at the CPS supplier's location, at the customer's location, as well as a process on the CPS devices allowing for the receipt and storage of the updates prior to install (e.g., SOTA-HW-001).

The customer SOTA may be ruggedized as necessary (e.g., SOTA-HW-002). The customer SOTA may run a type 1 hypervisor to run multiple virtualized SOTA servers and maintain isolation between these server instances (e.g., SOTA-HW-003). The customer SOTA may have one or more of the following computing hardware specifications: persistent memory; volatile memory; processing capacity; and/or Ethernet connectivity (e.g., SOTA-HW-004). The supplier SOTA may have the following general-purpose computing hardware specification: persistent memory; volatile memory; processing capacity; and/or Ethernet connectivity (e.g., SOTA-HW-005). The SMD should have sufficient processing capabilities to accommodate the updates (e.g., SOTA-HW-004). The SMD may have sufficient protected storage to accommodate the updates (e.g., SOTA-HW-005). The CPS should have sufficient processing capabilities to accommodate the updates (e.g., SOTA-HW-006). The CPS should have sufficient protected storage to accommodate the updates (e.g., SOTA-HW-007). The customer should have the communication ports for connecting to the SASH and SMD (e.g., SOTA-HW-008).

This section documents the security features that specify the extent to which the SOTA may protect itself and its sensitive data and communications from accidental, malicious, or unauthorized access, use, modification, destruction, or disclosure. The security features may implement security controls that allow the SOTA to meet the NIST SP 800-53 requirements such that SOTA meets moderator assurance impact level.

Below are the technical moderate impact requirements from NIST SP 800-53 that may be implemented by the SOTA:

TABLE 4

| Number | Title | Description |
| --- | --- | --- |
| SOTA-SEC-001 | Information Flow Enforcement | The information system enforces approved authorizations for controlling the flow of information within the system and between interconnected systems in accordance with applicable policy. |
| SOTA-SEC-002 | Separation of Duties | The organization: Separates duties of individuals as necessary, to prevent malevolent activity without collusion; Documents separation of duties; and Implements separation of duties through assigned information system access authorizations. |
| SOTA-SEC-003 | Least Privilege | The organization employs the concept of least privilege, allowing only authorized accesses for users (and processes acting on behalf of users) which are necessary to accomplish assigned tasks in accordance with organizational missions and business functions. |
| SOTA-SEC-004 | Unsuccessful Login Attempts | The information system: Enforces a limit of [Assignment: organization-defined number] consecutive invalid login attempts by a user during a [Assignment: organization-defined time period]; and Automatically [Selection: locks the account/node for an [Assignment: organization-defined time period]; locks the account/node until released by an administrator; delays next login prompt according to [Assignment: organization-defined delay algorithm]] when the maximum number of unsuccessful attempts is exceeded. The control applies regardless of whether the login occurs via a local or network connection. |
| SOTA-SEC-005 | System Use Notification | The information system: Displays an approved system use notification message or banner before granting access to the system that provides privacy and security notices consistent with applicable federal laws, Executive Orders, directives, policies, regulations, standards, and guidance and states that: (i) users are accessing a U.S. Government information system; (ii) system usage may be monitored, recorded, and subject to audit; (iii) unauthorized use of the system is prohibited and subject to criminal and civil penalties; and (iv) use of the system indicates consent to monitoring and recording; Retains the notification message or banner on the screen until users take explicit actions to log on to or further access the information system; and For publicly accessible systems: (i) displays the system use information when appropriate, before granting further access; (ii) displays references, if any, to monitoring, recording, or auditing that are consistent with privacy accommodations for such systems that generally prohibit those activities; and (iii) includes in the notice given to public users of the information system, a description of the authorized uses of the system. |
| SOTA-SEC-006 | Session Lock | The information system: Prevents further access to the system by initiating a session lock after [Assignment: organization-defined time period] of inactivity or upon receiving a request from a user; and Retains the session lock until the user reestablishes access using established identification and authentication procedures. |
| SOTA-SEC-007 | Wireless Access | The organization: Establishes usage restrictions and implementation guidance for wireless access; Monitors for unauthorized wireless access to the information system; Authorizes wireless access to the information system prior to connection; and Enforces requirements for wireless connections to the information system. |
| SOTA-SEC-008 | Auditable Events | The organization: Determines, based on a risk assessment and mission/business needs, that the information system may be capable of |

TABLE 4-continued

| Number | Title | Description |
| --- | --- | --- |
| | | auditing the following events: [Assignment: organization-defined list of auditable events]; Coordinates the security audit function with other organizational entities requiring audit-related information to enhance mutual support and to help guide the selection of auditable events; Provides a rationale for why the list of auditable events are deemed to be adequate to support after-the-fact investigations of security incidents; and Determines, based on current threat information and ongoing assessment of risk, that the following events are to be audited within the information system: [Assignment: organization-defined subset of the auditable events defined in AU-2 a. to be audited along with the frequency of (or situation requiring) auditing for each identified event]. |
| SOTA-SEC-009 | Content of Audit Records | The information system produces audit records that contain sufficient information to, at a minimum, establish what type of event occurred, when (date and time) the event occurred, where the event occurred, the source of the event, the outcome (success or failure) of the event, and the identity of any user/subject associated with the event. |
| SOTA-SEC-010 | Audit Storage Capacity | The organization allocates audit record storage capacity and configures auditing to reduce the likelihood of such capacity being exceeded. |
| SOTA-SEC-011 | Response To Audit Processing Failures | The information system: Alerts designated organizational officials in the event of an audit processing failure; and Takes the following additional actions: [Assignment: organization-defined actions to be taken (e.g., shut down information system, overwrite oldest audit records, stop generating audit records)]. |
| SOTA-SEC-012 | Audit Reduction and Report Generation | The information system provides an audit reduction and report generation capability. |
| SOTA-SEC-013 | Time Stamps | The information system uses internal system clocks to generate time stamps for audit records. |
| SOTA-SEC-014 | Protection of Audit Information | The information system protects audit information and audit tools from unauthorized access, modification, and deletion. |
| SOTA-SEC-015 | Audit Generation | The information system: Provides audit record generation capability for the list of auditable events defined in AU-2 at [Assignment: organization-defined information system components]; Allows designated organizational personnel to select which auditable events are to be audited by specific components of the system; and Generates audit records for the list of audited events defined in AU-2 with the content as defined in AU-3. |
| SOTA-SEC-016 | Identification and Authentication (organizational users) | The information system uniquely identifies and authenticates organizational users (or processes acting on behalf of organizational users). |
| SOTA-SEC-017 | Device Identification and Authentication | The information system uniquely identifies and authenticates [Assignment: organization-defined list of specific and/or types of devices] before establishing a connection. |
| SOTA-SEC-018 | Authenticator Feedback | The information system obscures feedback of authentication information during the authentication process to protect the information from possible exploitation/use by unauthorized individuals |
| SOTA-SEC-019 | Cryptographic Module Authentication | The information system uses mechanisms for authentication to a cryptographic module that meet the requirements of applicable federal laws, Executive Orders, directives, policies, regulations, standards, and guidance for such authentication. |

TABLE 4-continued

| Number | Title | Description |
| --- | --- | --- |
| SOTA-SEC-020 | Identification and Authentication (Non-organizational users) | The information system uniquely identifies and authenticates non-organizational users (or processes acting on behalf of non-organizational users). |
| SOTA-SEC-021 | Application Partitioning | The information system separates user functionality (including user interface services) from information system management functionality. |
| SOTA-SEC-022 | Information In Shared Resources | The information system prevents unauthorized and unintended information transfer via shared system resources. |
| SOTA-SEC-023 | Denial of Service Protection | The information system protects against or limits the effects of the following types of denial of service attacks: [Assignment: organization-defined list of types of denial of service attacks or reference to source for current list]. |
| SOTA-SEC-024 | Boundary Protection | The information system: Monitors and controls communications at the external boundary of the system and at key internal boundaries within the system; and Connects to external networks or information systems only through managed interfaces consisting of boundary protection devices arranged in accordance with an organizational security architecture. |
| SOTA-SEC-025 | Transmission Integrity | The information system protects the integrity of transmitted information. |
| SOTA-SEC-026 | Transmission Confidentiality | The information system protects the confidentiality of transmitted information. |
| SOTA-SEC-027 | Network Disconnect | The information system terminates the network connection associated with a communications session at the end of the session or after [Assignment: organization-defined time period] of inactivity. |
| SOTA-SEC-028 | Cryptographic Key Establishment and Management | The organization establishes and manages cryptographic keys for required cryptography employed within the information system. |
| SOTA-SEC-029 | Use of Cryptography | The information system implements required cryptographic protections using cryptographic modules that comply with applicable federal laws, Executive Orders, directives, policies, regulations, standards, and guidance. |
| SOTA-SEC-030 | Public Access Protections | The information system protects the integrity and availability of publicly available information and applications. |
| SOTA-SEC-031 | Collaborative Computing Devices | The information system: Prohibits remote activation of collaborative computing devices with the following exceptions: [Assignment: organization-defined exceptions where remote activation is to be allowed]; and Provides an explicit indication of use to users physically present at the devices. |
| SOTA-SEC-032 | Secure Name/Address Resolution Service (Authoritative Source) | The information system provides additional data origin and integrity artifacts along with the authoritative data the system returns in response to name/address resolution queries. |
| SOTA-SEC-033 | Architecture and Provisioning for Name/Address Resolution Service | The information systems that collectively provide name/address resolution service for an organization are fault-tolerant and implement internal/external role separation. |
| SOTA-SEC-034 | Session Authenticity | The information system provides mechanisms to protect the authenticity of communications sessions. |
| SOTA-SEC-035 | Protection of Information At Rest | The information system protects the confidentiality and integrity of information at rest. |
| SOTA-SEC-036 | Information System Partitioning | The organization partitions the information system into components residing in separate physical domains (or environments) as deemed necessary. |

The architecture, design, and implementation constraints on the system are described below. Data constraints may include designing the SOTA such that it is certifiable to process and store sensitive data.

The SOTA receive process running on the CPS devices software may be designed to operate on typical CPS devices and applications. Typical CPS devices and applications might include: computing platforms with no operating system, or a real-time operating system; computing platforms with limited RAM, flash, and CPU; platform-specific libraries; and/or minimal libraries.

Design constraints associated with industry standards are described below. The SOTA may meet the NIST RMF requirement such that the SOTA is assessable and authorizable when it is integrated and deployed onto a system environment (e.g., a plant). The supplier SOTA may meet standard for enterprise security for computer systems. The customer SOTA may meet standards for military at sea use for computer systems.

If the CPS device supports update without taking the device offline, e.g., via hotswapping of OS, the SOTA may be designed to support this option. The CPS platform may grant access to the customer SOTA system to the CPS supplier.

Figure 20:
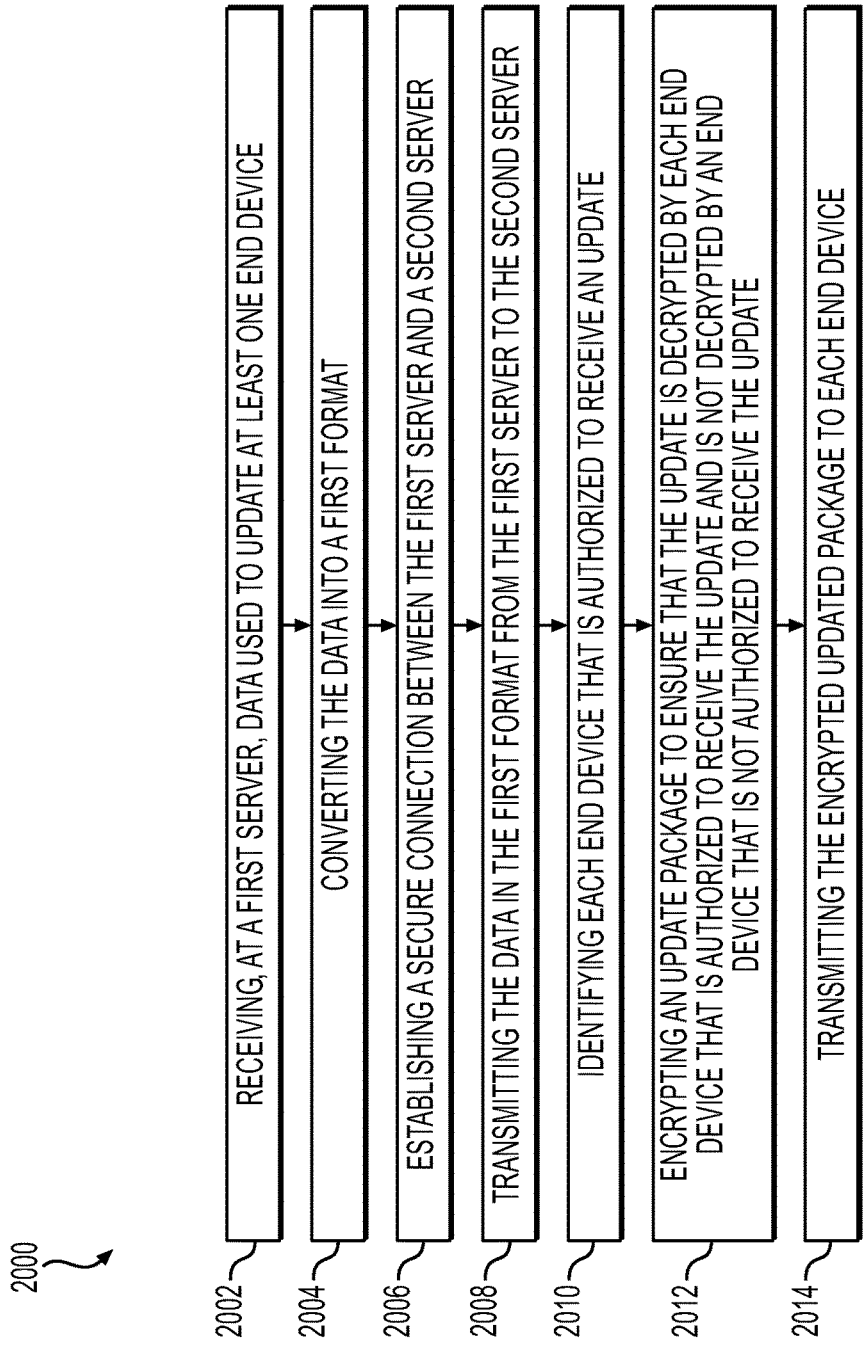
FIG. 20 depicts an example flowchart of a method for providing updates to a device, according to one or more embodiments.

FIG. 20 depicts a flowchart of a method 2000 for securely updating a device, according to one or more embodiments. For example, at step 2002, the method may include receiving, at a first server, data used to update at least one end device. At step 2004, the method may include converting the data into a first format. At step 2006, the method may include establishing a secure connection between the first server and a second server. At step 2008, the method may include transmitting the data in the first format from the first server to the second server. At step 2010, the method may include identifying each end device that is authorized to receive an update. At step 2012, the method may include encrypting an update package to ensure that the update is decrypted by each end device that is authorized to receive the update and is not decrypted by an end device that is not authorized to receive the update. At step 2014, the method may include transmitting the encrypted updated package to each end device.

Figure 21:
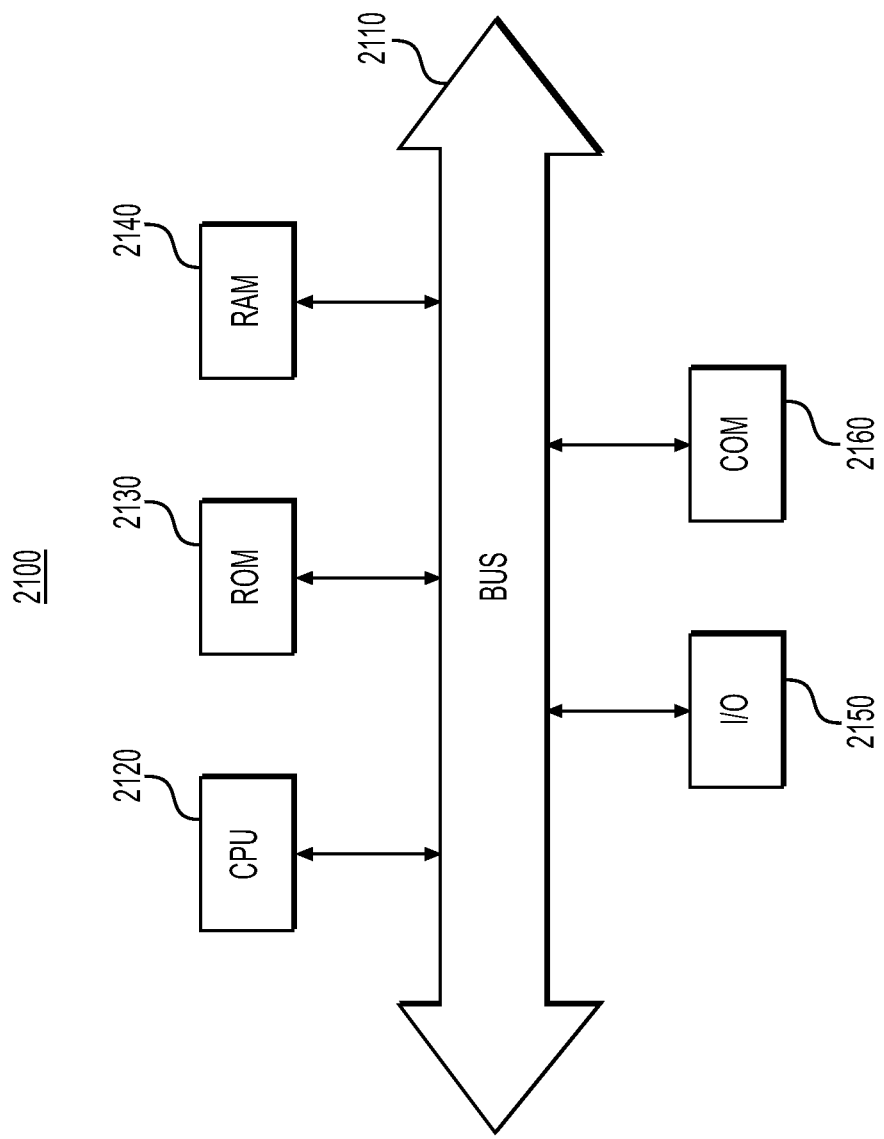
FIG. 21 depicts an example computer device or system, in which embodiments of the present disclosure, or portions thereof, may be implemented.

FIG. 21 depicts an exemplary computer device or system, in which embodiments of the present disclosure, or portions thereof, may be implemented. Each of the computing system(s), databases, user interfaces, and methods described above with respect to FIGS. 1-20 can be implemented via device 2100 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-20.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-20, may be implemented using device 2100. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 21, device 2100 may include a central processing unit (CPU) 2120. CPU 2120 may be any type of processor device including, for example, any type of special purpose or a general-purpose microprocessor device. As will be appreciated by persons skilled in the relevant art, CPU 2120 also may be a single processor in a multi-core/multi-processor system, such system operating alone, or in a cluster of computing devices operating in a cluster or server farm. CPU 2120 may be connected to a data communication infrastructure 2110, for example, a bus, message queue, network, or multi-core message-passing scheme.

Device 2100 also may include a main memory 2140, for example, random access memory (RAM), and also may include a secondary memory 2130. Secondary memory 2130, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 2130 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 2100.

Device 2100 also may include a communications interface ("COM") 2160. Communications interface 2160 allows software and data to be transferred between device 2100 and external devices. Communications interface 2160 may include a modem, a network interface (such as an Ethernet card), a communications port, a PCMCIA slot and card, or the like. Software and data transferred via communications interface 2160 may be in the form of signals, which may be electronic, electromagnetic, optical, or other signals capable of being received by communications interface 2160. These signals may be provided to communications interface 2160 via a communications path of device 2100, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 2100 also may include input and output ports 2150 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for providing secure remote software updates to a cyber-physical systems (CPS) device, the method comprising:
   receiving, at a first server, data used to automatically update embedded software of at least one CPS device;
   converting, at the first server, the data into a first format;
   establishing a secure connection between the first server and a first network interface of a second server, the second server including an isolated domain comprising a second network interface coupled to a secure network gateway, the second network interface providing network separation between the first network interface and the secure network;
   transmitting the data in the first format from the first server to the second server;
   identifying, at the second server, each CPS device that is authorized to receive a software update in the isolated domain;
   encrypting, at the second server, a software update package comprising the data;
   establishing a second secure connection between the second server and the CPS device using an existing serial connection;
   pushing the encrypted software update package from the second server to each CPS device via the second secure connection;
   receiving and decrypting the encrypted software update package at the CPS device, wherein one or more private keys of a supplier of the software update are used to authenticate the software update package; and
   installing the software update package at the CPS device.

2. The computer-implemented method of claim 1, wherein the first server is a supplier secure over-the-air (SOTA) server and the second server is a customer SOTA server.

3. The computer-implemented method of claim 1, wherein identifying each CPS device that is authorized to receive the software update comprises analyzing metadata associated with the software update package.

4. The computer-implemented method of claim 1, wherein encrypting the software update package comprises encrypting the software update package with an encryption key.

5. The computer-implemented method of claim 1, wherein encrypting the software update package comprises encrypting the software update package with an encryption key that is further encrypted by a series of keys.

6. The computer-implemented method of claim 1, wherein encrypting the software update package comprises encrypting the software update package with an ephemeral encryption key.

7. The computer-implemented method of claim 6, further comprising encrypting the ephemeral encryption key by a series of keys configured to allow only each CPS device that is authorized to receive the software update to decrypt the encrypted software updated package.

8. The computer-implemented method of claim 7, further comprising choosing the series of keys using a logical key hierarchy (LKH) tree-based broadcast encryption method.

9. A system for providing secure remote software updates to a cyber-physical systems (CPS) device, the system comprising:
   a memory storing instructions; and
   a processor executing the instructions to perform a process including:
      receiving, at a first server, data used to automatically update embedded software of at least one CPS device;
      converting, at the first server, the data into a first format;
      establishing a secure connection between the first server and a first network interface of a second server, the second server including an isolated domain comprising a second network interface coupled to a secure network gateway, the second network interface providing network separation between the first network interface and the secure network;

transmitting the data in the first format from the first server to the second server;

identifying, at the second server, each CPS device that is authorized to receive a software update in the isolated domain;

encrypting, at the second server, a software update package comprising the data;

establishing a second secure connection between the second server and the CPS device using an existing serial connection;

pushing the encrypted software update package from the second server to each CPS device via the second secure connection;

receiving and decrypting the encrypted software update package at the CPS device, wherein one or more private keys of a supplier of the software update are used to authenticate the software update package; and installing the software update package at the CPS device.

10. The system of claim 9, wherein the first server is a supplier secure over-the-air (SOTA) server and the second server is a customer SOTA server.

11. The system of claim 9, wherein identifying each CPS device that is authorized to receive the software update comprises analyzing metadata associated with the software update package.

12. The system of claim 9, wherein encrypting the software update package comprises encrypting the software update package with an encryption key.

13. The system of claim 9, wherein encrypting the software update package comprises encrypting the software update package with an encryption key that is further encrypted by a series of keys.

14. A non-transitory computer-readable medium storing instructions that, when executed by a processor, cause the processor to perform a method for providing secure remote software updates to a cyber-physical systems (CPS) device, the method comprising:

receiving, at a first server, data used to automatically update embedded software of at least one CPS device;

converting, at the first server, the data into a first format;

establishing a secure connection between the first server and a first network interface of a second server, the second server including an isolated domain comprising a second network interface coupled to a secure network gateway, the second network interface providing network separation between the first network interface and the secure network;

transmitting the data in the first format from the first server to the second server;

identifying, at the second server, each CPS device that is authorized to receive a software update in the isolated domain;

encrypting, at the second server, a software update package comprising the data;

pushing the encrypted software update package from the second server to each CPS device via the second secure connection;

receiving and decrypting the encrypted software update package at the CPS device, wherein one or more private keys of a supplier of the software update are used to authenticate the software update package; and installing the software update package at the CPS device.

15. The non-transitory computer-readable medium of claim 14, wherein the first server is a supplier secure over-the-air (SOTA) server and the second server is a customer SOTA server.

16. The non-transitory computer-readable medium of claim 14, wherein identifying each CPS device that is authorized to receive the software update comprises analyzing metadata associated with the software update package.

17. The non-transitory computer-readable medium of claim 14, wherein encrypting the software update package comprises encrypting the software update package with an encryption key.

18. The non-transitory computer-readable medium of claim 14, wherein encrypting the software update package comprises encrypting the software update package with an encryption key that is further encrypted by a series of keys.

* * * * *